(12) United States Patent
Tran

(10) Patent No.: US 6,202,060 B1
(45) Date of Patent: *Mar. 13, 2001

(54) DATA MANAGEMENT SYSTEM

(76) Inventor: Bao Q. Tran, 10206 Grove Glen, Houston, TX (US) 77099

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,377

(22) Filed: Oct. 29, 1996

(51) Int. Cl.$^7$ ............................................. G06F 9/00
(52) U.S. Cl. ................................ 707/3; 707/104
(58) Field of Search ........................................ 707/1–206

(56) References Cited

U.S. PATENT DOCUMENTS

| | | | |
|---|---|---|---|
| 4,429,385 | 1/1984 | Cichelli et al. | 370/92 |
| 5,231,698 | * 7/1993 | Forcier | 707/541 |
| 5,337,104 | 8/1994 | Folger et al. | 340/825 |
| 5,392,390 | 2/1995 | Crozier | 395/161 |
| 5,404,321 | 4/1995 | Mattox | 364/709 |
| 5,436,983 | 7/1995 | Bernzott et al. | 382/229 |
| 5,442,633 | 8/1995 | Perkins et al. | 370/94 |
| 5,446,891 | 8/1995 | Kaplan et al. | 395/600 |
| 5,455,579 | 10/1995 | Bennett et al. | 341/110 |
| 5,459,458 | 10/1995 | Richardson et al. | 340/825 |
| 5,463,696 | 10/1995 | Beernink et al. | 382/186 |
| 5,485,503 | 1/1996 | Diem | 379/57 |
| 5,491,785 | 2/1996 | Robson et al. | 395/162 |
| 5,495,344 | 2/1996 | Callaway, Jr. et al. | 358/407 |
| 5,497,339 | 3/1996 | Bernard | 364/705 |
| 5,502,637 | 3/1996 | Beauliex et al. | 364/408 |
| 5,502,805 | * 3/1996 | Anderson | 707/503 |
| 5,506,902 | 4/1996 | Kubota | 380/9 |
| 5,510,606 | 4/1996 | Worthington et al. | 235/472 |
| 5,514,861 | 5/1996 | Swartz et al. | 235/472 |
| 5,524,240 | * 6/1996 | Barbara et al. | 707/3 |
| 5,537,586 | 7/1996 | Aworam et al. | 395/600 |
| 5,546,395 | 8/1996 | Sharma et al. | 370/84 |
| 5,553,063 | 9/1996 | Dickson | 370/29 |
| 5,559,742 | 9/1996 | Bottoms et al. | 370/20 |
| 5,559,897 | 9/1996 | Brown et al. | 382/186 |
| 5,564,070 | 10/1996 | Want et al. | 455/53 |
| 5,572,643 | 11/1996 | Judson | 395/793 |
| 5,590,257 | * 12/1996 | Forcier | 707/530 |
| 5,613,019 | * 3/1997 | Altman et al. | 382/311 |

OTHER PUBLICATIONS

Intel, Application Notes AP 399 and 362 (1994).
ISD Databook (1996) ch. 12–13.
ISD, Chiplander™ Technology by ISP (1996).
F. Goodenough, Single IC Stores & Plays Back 4 Minutes of Voice, Elec Design Jul. 22, 1996 pp. 67–70.
NcI, Flachbreich Brochures, No date.
Crytal Semi, CS9236 Data Sheet Oct. 1996.
Crystal Semi, A Tutorial on MIDI and Waveable Music Synthesis Nov. 1993.
D. Bursky, 3D Audio Tech. Provide Realistic Sound Electronic Design Jan. 1996 pp. 79–96.
Logi Tech, Scan Man PowerPage Brochure (1993).
UBI, Brochures for Scanner Products.
System ID Wavebrouse, vol. 6.3 (Sep.–Nov. 1996).
Hamamatsu, MOS Linear Image Sensors & Application Note no date.

(List continued on next page.)

Primary Examiner—Hosain T. Alam
Assistant Examiner—John G. Mills, III
(74) Attorney, Agent, or Firm—Kurt J. Brown

(57) ABSTRACT

A portable computer system manages data conveniently for a user. The system has a processor, a program storage device coupled to the processor, an input recognizer adapted to receive non-cursive handwritings from the user and to convert the handwriting to data, and a computer readable code embodied in the program storage device for storing and processing the data.

20 Claims, 26 Drawing Sheets

OTHER PUBLICATIONS

Imainy Magazine, Unzipping the Recognition Undergrowth, pp. 68–76.

M. Herman, Fundamentals of H. 324 Desktop Videocolortechnology, Elec. Res. Oct. 1996 pp. 116–688.

B. Brannon, Wide–dynamic range AID converters prove the way for wideband digital radio receivers, Elec. Design News Nov. 7, 1996, pp. 187–205.

R Hosking, Digital Receivers Bring DSP to Radio Electronics RIC pp. 33–37.

Intel. Nokia, Narrowband Sockets Specification Rev. 0.9, Sep. 1996.

C.J. Mathias, Wireless Coming to a LAN Near You, Mobile Computing & Comm Oct. 1996 pp. 53–67.

TG Hollier, Wireless LANs get Connected, Information Week Aug. 5, 1996 pp. 78–86.

J.D. Gibson, The Mobile Communication Handbook pp. 541–567.

Isaacson et al., An Introduction to Wireless Data Communications (1996).

Autotech Cellular Cellular Digital Packet Data System (1994).

Cellport Labs, Mobile Web™, A Technology White Paper no date.

GTE, Cellular Digital Packet Data (CDPD) ICP/IP Connection (May 1995).

Implementing Wireles Networks–Ch. 6.

Gardiner & West, Personal Communication Systems & Technology, Ch. 4–8,10–12.

PCSI Brochures on Personal Air Communications Technology (PACT).

Mark Moore, Smart Pagers browse the Web, PC Week, Sep. 16, 1996 pp. 27,29.

Web page on page Writer at . . . Mot/Com/MIMS/MSPG/Products/Two–way pagewave.

Oracle Corp. White Paper: Oracle Mobile Agents (Mar. 1995).

Wirbel, Alliance to spin a Wireless Web, EET, Jul. 15, 1996 pp. 1.

Yoshida, Web TV calls Sony, Phillps into the Net, EET Jul. 15, 1996 p. 16.

M. Blanchette, Synchronization in the Era of Mbile User Port Design Oct. 1996 p25–27.

D. Lawrence, Inside the Universal Serial Bus. Elec. Design Jul. 22, 1996 pp. 123–132.

Harris Corp., Prism Brochure (1996).

Casio Corp., Brochure on Casio QV family of digital cameras (1996).

Pagerola Corp., Brochure on Message Sender (1996).

Motorola Corp., Brochure on FLEX (1996).

SkyTel Corp., Brochure on SkyTel 2–Way Paging no date.

Apple Computer Inc., Brochure on Apple Message Pad Selecins for Sales Proposals (1996).

Balwires Software Inc. Leverage Quick Reference Card (1994).

Messmer, The Indispensible PC Hardware Book (1996) pp. 651–683.

Texas Inst. TSL235 and TSL 245 Data Sheets no date.

Dave Ruske, Making Sense of PCMCIA, Rockwell Software, Inc. no date.

ISD Databook (1996).

ITU–T, Draft Recommendations V.70, V.75 and V.80 (1996).

A. Davis, Videoconferencing—Calling New Networks, OEM Mag. Jan. 1997 pp. 60–67,77.

The Mac—Barcode Company—1996 Catalog.

The Mac—Barcode Company —Brochure for Newton Walk—About (1996).

Newtech Co., Brochure for Field Worker 2.0 (1996).

Stock Tips Co., Brochure for Stock TIPS (1996).

R. Quinnell, Internet audio & video create tremors in the Web, EDN (Dec. 19, 1996) pp. 43–52.

* cited by examiner

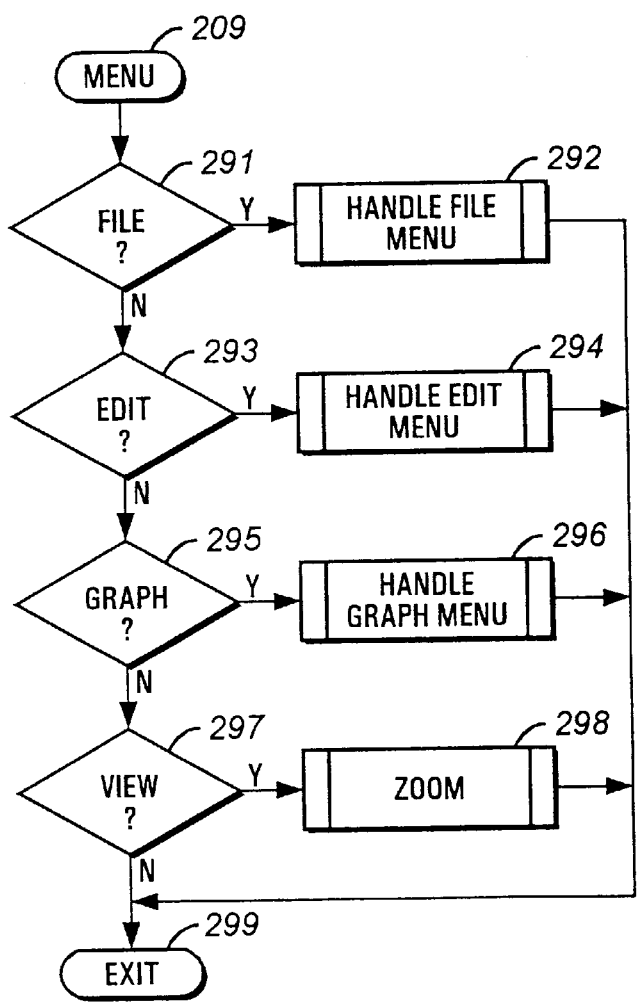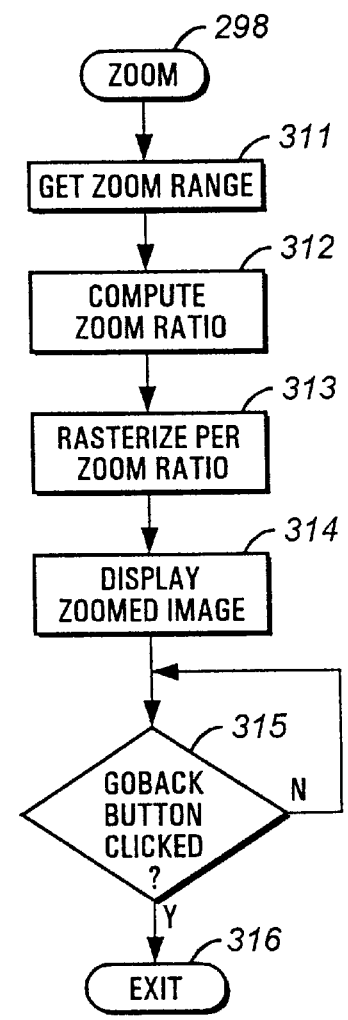
FIG. 12  FIG. 13

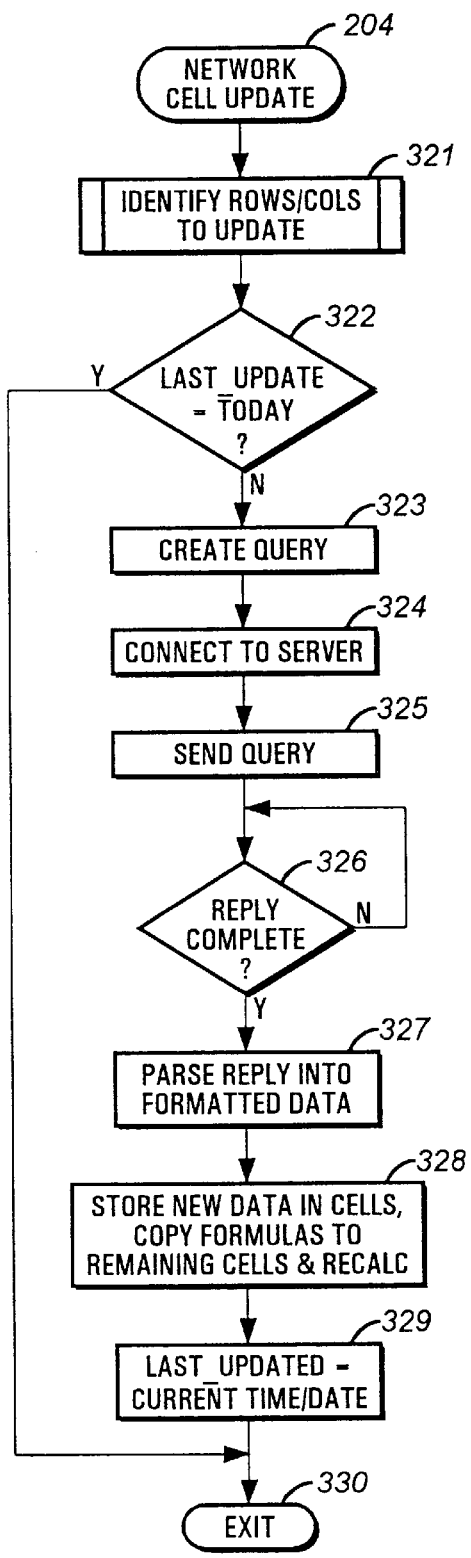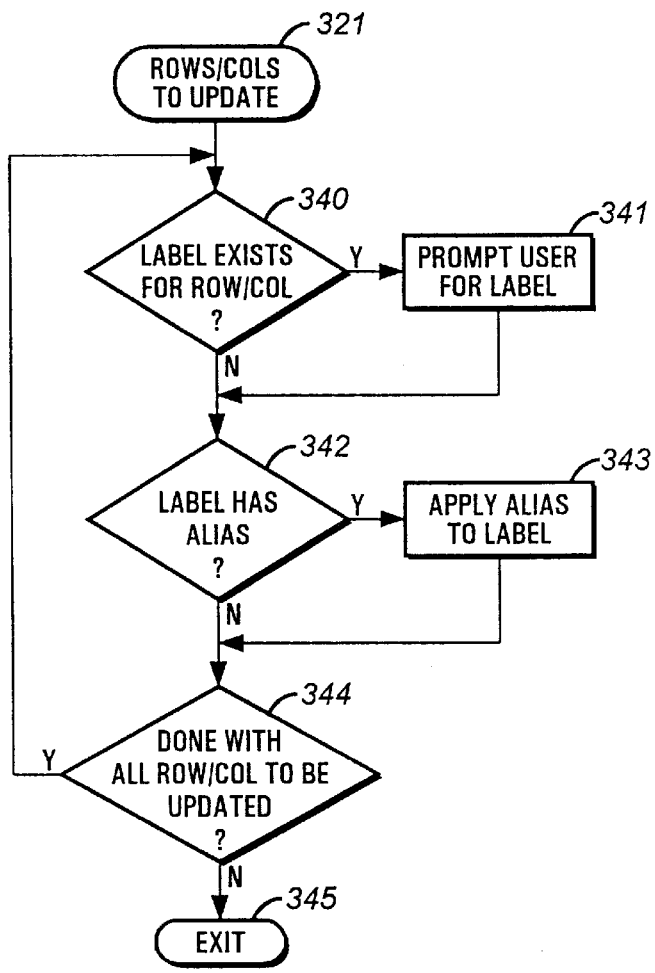
FIG. 14
FIG. 15

DATA MANAGEMENT SYSTEM

FIELD OF THE INVENTION

The present invention relates to a data management system, and more particularly, to a data management system for a mobile computer.

BACKGROUND OF THE INVENTION

Before the advent of computers, the assimilation and interpretation of information required extensive manual data collection as well as error-prone hand calculations carried out by many individuals. The manual tabulation of large quantities of data typically resulted in a small percentage of errors in the collected data. Furthermore, additional errors had been introduced through the use of laborious manual numerical analyses. Although the adoption of accountant's columnar pads to create paper spreadsheets eased the assimilation of data and reduced the error propagation, the manual preparation of such spreadsheet was rather tedious error prone to calculation errors, and expensive in labor.

The advent of personal computers brought forth electronic spreadsheets such as VISICALC, LOTUS-1-2-3, EXCEL and QUATRO-PRO and databases such as D-BASE, VISUAL FOX-PRO and ACCESS which provide convenient systems for quickly organizing information. As discussed in U.S. Pat. No. 5,502,805, entitled "SYSTEM AND METHODS FOR IMPROVED SPREADSHEET INTERFACE WITH USER-FAMILIAR OBJECTS", typical spreadsheet programs configured the memory of the computer to resemble the column/row or grid format of an accountant's columnar pad, thus providing a visible calculator for a user in each cell of the column/row format. To communicate the location of the cell, a common scheme assigned a number to each row in the spreadsheet and a letter to each column. Thus, the cell represented the basic addressable storage location of the spreadsheet at each intersection of a row with a column. In addition to holding text descriptions and numeric data, each cell can store formulas or special instructions specifying calculations to be performed on the numbers stored in the cells. Upon receipt of new data, the formulas were automatically updated to support "what if" scenarios.

Computerized spreadsheets offered many advantages over the old pen-and-paper approach. For one, these spreadsheets were capable of supporting very large spreadsheets that would be unwieldy to maintain by hand. Further, the computerized spreadsheets were capable of supporting scenario calculations where the entered information may be quickly recalculated with different assumptions. Thus, these computerized spreadsheets offered dramatic improvements in ease of creating, editing and applying mathematical models such as financial forecasting. Similarly, databases allowed users to maintain vast quantities of data and to manipulate the information via query commands. Thus, the usefulness of spreadsheets, databases and other business applications made them staple software for data summary, advanced numerical analysis and charting applications.

Although computerized spreadsheets and databases offered significant productivity gains in modeling complex data, none was as intuitive to use as the old, but familiar paper and pencil. To use the new technology, the user had to type information into the cells of the spreadsheet. In the hand of inexperienced users, the data entry aspect was unpleasant. Further, the verification for correct data entry was time consuming. Additionally, the user had to master many complex and arbitrary operations. For example, to find the proper commands, the user needed to traverse several nodes of a menu. Advances in computer technology had not simplified life for users, since these advances have been largely employed to build more complex functions and modeling capability into the spreadsheet with even more menus and submenus. Since the alternative of perusing through a staggering array of incomprehensible icons was not also palatable to users, most users only used a fraction of the available commands and features. Furthermore, conventional computerized spreadsheets and databases still required users to manually enter the information.

Additionally, applications such as spreadsheets, databases, project planning tools and CAD/CAM systems required large display areas to quickly and conveniently interact with users. However, portable computing appliances must balance the conflicting requirements of the readability of the displayed characters and the size of their display screens. On one hand, the portability requirement implied that the screen be small. On the other hand, the readability requirement pushed in the opposite direction and dictated that the display area be as large as possible. However, as computing appliances with large screens consumed more power, were more fragile, expensive and bulkier, most portable computers offered only a small display surface. The selection of a small display size restricted the user into making undesirable choices between displaying either larger characters or more information. For busy executives, attorneys, doctors and other professionals, such restrictions were impractical. Thus, the display system need to be portable, cost effective, and easy to use in comparison with the pen and paper approach before the conventional pen and paper method can be replaced.

In addition to being as easy to use as the pen and paper approach, the portable computing appliance needed to provide information integration advantages, including the ability to capture data from scanners, barcode readers, or the Internet, over the cheaper pen and paper approach to further justify the expense associated with such electronic computer systems. Furthermore, as portable computers are typically deployed in field applications by service providers where employees are scattered over a wide geographic area, the information advantages arising from integrating data associated with a global positioning system (GPS) are needed in the management and control of field personnel to ensure that the employees are actually at the respective expected locations. Additionally, an ability to link information generated at the client's site with follow-up discussions and letters necessary to close the transaction is needed to enhance the efficiency of field personnel.

SUMMARY OF THE INVENTION

The present invention provides a spreadsheet and a database on a portable computer which accepts data from an input recognizer which includes a non-cursive handwriting recognizer or a speech recognizer. The portable computer can communicate data directly with another computer or over the Internet using wireless media such as radio and infrared frequencies or over a landline. It is endowed with a plurality of built-in or snap-on expansion accessories to enhance the data capture capability as well as the ease of reading data from the limited screen of the present invention. These accessories include a camera, a scanner, a voice recorder or voice capture unit, a global position system (GPS) receiver and a remote large screen television. The camera and scanner allows visual data to be capture, the voice recorder allows the user to make quick verbal annotations into a solid state memory to minimize the main memory requirements, while the voice capture unit allows the voice to be captured into memory for subsequent transmission over the Internet or for voice recognition purposes. The spreadsheet or database receives data from the Internet or from the accessories and further can graph or manipulate the data entered into the spreadsheet as necessary. Furthermore, the database has a smart search engine interface which performs fuzzy search such that inexact queries can still result in matches. The smart search engine thus allows users to locate information even though the exact spelling or concept is not known. To minimize user's work in locating information to analyze, the spreadsheet and database can spawn and train an intelligent agent to capture data from a suitable remote source such as the Internet and transmit the data to the spreadsheet or database for further analysis. Alternatively, the user can capture data directly by scanning or dictating the information into the spreadsheet or database. The geographical information can be generated automatically via the GPS receiver. Data from the receiver is communicated via a suitable pager or wireless transceiver back to either a mapping application or other management tools to allow management to monitor the field user's whereabouts. In another aspect of the invention, a pan and zoom capability is provided to provide the user with an appropriately scaled view of the data for ease of reading. Alternatively, when the portable computer is within range of a larger display device such as an appropriately equipped television display or a personal computer with a larger display, the present invention's wireless link transmits the video information to the larger display to allow the user to view data the larger display unit. Similarly, when the portable computer is within range of a suitably equipped stereo receiver, the portable computer transmits MIDI data streams to the receiver such that the MIDI sound generator can produce high quality sound for multimedia applications running on the portable computer, even though the stereo receiver is not tethered to the portable computer of the present invention.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 12 is a flowchart illustrating the process for handling menu events of FIG. 6;

FIG. 13 is a flowchart illustrating the zoom process of FIG. 12;

FIG. 14 is a flowchart illustrating the process for updating the spreadsheet cells of FIG. 6 using a remote database;

FIG. 15 is a flowchart illustrating the process for identifying rows/columns to update in FIG. 14;

DETAILED DESCRIPTION OF THE PREFERRED EMBODIMENT

Figure 1:
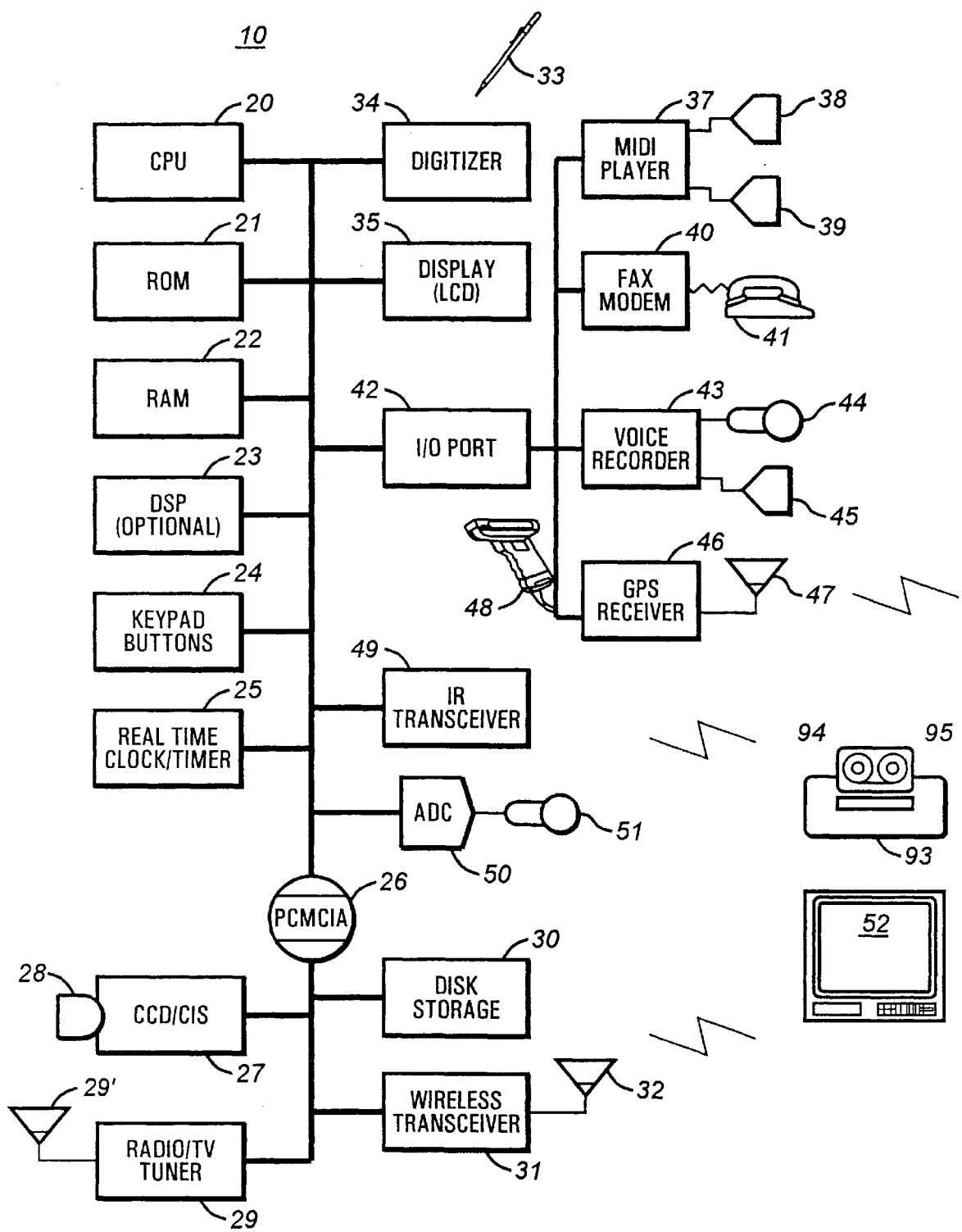
FIG. 1 is a block diagram of a portable computer system for providing data management support in accordance with the present invention.

FIG. 1 illustrates the computer system of the present invention for managing data. The computer system is preferably housed in a small, rectangular portable enclosure. Referring now to FIG. 1, a general purpose architecture for entering information into the data management by writing or speaking to the computer system is illustrated. In FIG. 1, a processor 20 or central processing unit (CPU) provides the processing capability for the sketching system of the present invention. The processor 20 can be a reduced instruction set computer (RISC) processor or a complex instruction set computer (CISC) processor. Preferably, the processor 20 is a low power CPU such as the MC68328V DragonBall device available from Motorola Inc.

The processor 20 is connected to a read-only-memory (ROM) 21 for receiving executable instructions as well as certain predefined data and variables. The processor 20 is also connected to a random access memory (RAM) 22 for storing various run-time variables and data arrays, among others. The RAM 22 is sufficient to store user application programs and data. In this instance, the RAM 22 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 21 for data back-up purposes. The RAM 22 stores a database of the spreadsheet of the present invention, among others.

The computer system 10 of the present invention has built-in applications stored in the ROM 21 or downloadable to the RAM 22 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. In addition to the built-in applications, add-on applications such as time and expense recording systems taught in U.S. application Ser. No. 08/650,293, entitled "TIME AND EXPENSE LOGGING SYSTEM", and sketching/drawing tools as filed in U.S. application Ser. No. 08/684,842, entitled "GRAPHICAL DATA ENTRY SYSTEM", both of which are hereby incorporated by reference, can be added to increase the user's efficiency. Additionally, project planning tools, and CAD/CAM systems, Internet browsers, among others, may be added to increase the functionality of portable computing appliances. Users benefit from these software, as the software allow users to be more productive when they travel as well as when they are in their offices.

The processor 20 is also connected to an optional digital signal processor (DSP) 23 which is dedicated to handling multimedia streams such as voice and video information. The DSP 23 is optimized for video compression using JPEG/MPEG standards known to those skilled in the art. Furthermore, the DSP 23 is equipped to handle the needs of a voice recognition engine. Although the DSP 23 is shown as a separate unit from the CPU 20, the present invention contemplates that the DSP 23 can also be integrated with the CPU 20 whereby the CPU 20 can rapidly execute multiply-accumulate (MAC) instructions in either scalar or vector mode.

The computer system of the present invention receives instructions from the user via one or more switches such as push-button switches in a keypad 24. The processor 20 is also connected to a real-time clock/timer 25 which tracks time. The clock/timer 25 can be a dedicated integrated circuit for tracking the real-time clock data, or alternatively, the clock/timer 25 can be a software clock where time is tracked based on the clock signal clocking the processor 20. In the event that the clock/timer 25 is software-based, it is preferred that the software clock/timer be interrupt driven to minimize the CPU loading. However, even an interrupt-driven software clock/timer 25 requires certain CPU overhead in tracking time. Thus, the real-time clock/timer integrated circuit 25 is preferable where high processing performance is needed.

Further, the timer portion of the clock/timer 25 can measure a duration count spanning one or more start times and completion times, as activated by the user. The timer portion has a duration count register which is cleared upon the start of each task to be timed. Further, the timer portion of the clock/timer 25 has an active state and a passive state. During operation, when the user toggles the timer portion into the active state, the duration count register is incremented. When the user toggles the timer portion into the suspended state, the duration count is preserved but not incremented. Finally, when the user completes a particular task, the value of the duration count register is indicated and stored in a database to track time spent on a particular task.

To provide for expandability, the processor 20 drives a PCMCIA bus 26 which provides a high speed interface or expansion bus. Via the PCMCIA bus 26, the computer system can acquire visual information via a charged coupled device (CCD) or a CIS unit 27. The CCD/CIS unit 27 is further connected to a lens assembly 28 for receiving and focusing light beams to the CCD or CIS for digitization. The CCD/CIS unit 27 thus can be either a digital camera or a page scanner, as shown in more detail in FIG. 2. Images scanned via the CCD/CIS unit 27 can be compressed and transmitted via a suitable network such as the Internet, via cellular telephone channels or via facsimile to a remote site.

In the event where the CCD/CIS unit 27 is a camera and where the application is videoconferencing, the CPU 20 and/or the DSP 23 operate to meet the ITU's H.324 standard on multimedia terminal for low-bit-rate visual services for analog telephony. Preferably, the DSP 23 supports H.261 video encoding an decoding at CIF resolution of up to 15 frames per second, H.263 video and G.723 audio, MPEG-1 audio and video play-back, MPEG-1 video encoding, JPEG and motion JPEG, and advanced motion estimation, input and output video scaling, noise-reduction filters and forward error correction.

Until recently, videoconferencing had been the province of dedicated systems housed in special-purpose viewing rooms. But since the development of software packages such as CU-SeeMe, desktop videoconferencing has become more widely accessible through networked personal computers. Via the video camera 27, the 16 gray level LCD 35, and Internet access through the modem or other connection with at least 28.8 kilobits-per-second capacity, the portable computer of the present invention can operate with videoconferencing software compatible with CU-SeeMe, available for IBM PC or Macintosh computers from the Internet at http://cu-seeme.cornell.edu or ftp://cu-seeme.cornell.edu/pub/video. Preferably, the CU-SeeMe software in the portable computer 10 can exchange video and audio transmissions either person-to-person or in group conferences. In the latter case, users must dial into a "reflector" site housed on a Unix computer. A reflector does just what its name suggests, accepting transmissions from individual users and distributing them to all the members of the group. The number of callers that can be connected depends on the bandwidth available to a given reflector system.

When an individual establishes a videoconferencing link by dialing an Internet protocol number, black-and-white video windows of up to eight other users can pop up at once on the caller's screen. The program randomly selects which participants to show in the windows, but the user can change the selections from a menu of conference participants. Users normally train their cameras on themselves but sometimes show close-up views of photographs, scenery outside office windows, or even special events such as musical performances. Furthermore, a "talk window" section allows users to type comments or questions in a text box that carries a running transcript at the base of the video window. This feature compensates for the notoriously poor quality of audio on the Internet, where data packets can get delayed or lost because they all share the same congested electronic traffic stream. In contrast, telephone callers are allotted an entire circuit for the length of each call. Additionally, "lurkers" without video cameras can also participate in conversations by speaking through microphones in their personal computers or typing comments into talk windows. Or they can simply look and listen without acknowledging their presence. In this manner, the user of the portable computer 10 can attend meetings remotely and bringing his or her expertise to the members of the meeting without incurring travel or time costs.

In addition to the camera 27, the PCMCIA expansion bus 26 is also adapted to receive a radio tuner or a TV tuner 29, which is in turn connected to a built-in antenna. The radio/TV tuner 29 receives radio and/or TV signals and digitizes the information for suitable processing by the CPU 20. In this manner, the user of the computer 10 can listen to the radio or watch television while he or she works. The PCMCIA bus 26 is also adapted to receive a data storage device, or disk 30. Additionally, the PCMCIA bus 26 can receive a wireless transceiver 31, which is connected to an antenna 32. The wireless communication device 31 satisfies the need to access electronic mail, paging, mode/facsimile, remote access to home computers and the Internet. One simple form of wireless communication device 31 is an analog cellular telephone link where the user simply accesses a cellular channel similar to the making of a regular voice call. However, the transmission of digital data over an analog cellular telephone network can give rise to data corruption. Digital wireless networks such as cellular digital packet data (CDPD) can be used. CDPD provides data services on a noninterfering basis with existing analog cellular telephone services. In addition to CDPD, a communication service called Personal Communication Services (PCS) allows wireless access into the public service telephone network.

The two-way communication device 31 can also be a two-way pager where the user can receive as well as transmit messages. The two-way communication device supports a Telocator Data Protocol by the Personal Communications Association for forwarding binary data to mobile computers. The standard facilitates transmission of images and faxes over paging and narrowband PCS networks. Alternatively, the two-way communication device 31 can be substituted with a cellular telephone, whose block diagram and operation are discussed in detail in a co-pending U.S. application Ser. No. 08/461,646, hereby incorporated-by-reference.

In the event that two-way pagers are used, the present invention contemplates that the two-way communication device 31 be compatible with pACT (personal Air Communications Technology), which is an open standard developed by Cirrus Logic—PCSI and AT&T Wireless Services Inc. (Kirkland, Wash.). pACT is a narrowband, 900 Mhz range PCS technology derived from the cellular digital packet data transmission standard. pACT is optimized for applications such as acknowledgment paging, mobile e-mail, wireless Internet access, voice paging, personal home security and dispatch services. Based on the Internet IP standard, pACT provides full data encryption and authentication, enabling the efficient, full delivery of reliable and secure messages. Alternatively, in place of pACT, a REFLEX protocol from Motorola Inc. may be used. The REFLEX protocol is commercially supported by SkyNet—Mtel Corporation.

The two-way communication device 31 has a receiver, a transmitter, and a switch, all are controlled by the CPU 20 via the bus of the portable computer system of FIG. 1. The switch receives an input from the antenna 32 and appropriately routes the radio signal from the transmitter to the antenna 32, or alternatively, the radio signal from the antenna 32 to the receiver in the event the processor 20 is expecting a message. Via the bus 26, the processor 20 controls the receiver, the transmitter, and the switch to coordinate the transmission and receipt of data packets. The receiver and transmitter are standard two-way paging devices or standard portable cellular communication chips available from Motorola, Inc. in Schaumburg, Ill. or Philips Semiconductors in Sunnyvale, Calif. The antenna 32 is preferably a loop antenna using flat-strip conductors such as printed circuit board wiring traces as flat strip conductors have lower skin effect loss in the rectangular conductor than that of antennas with round-wire conductors.

Turning now to the structure of the data packet to be transmitted/received to and from the two way two-way communication device 31. A plurality of fields are provided, including a header field, a destination address field, a source address field, a date/time stamp field, a cyclic redundancy check field, and a data field. As is known in the art, the header field functions as a synchronization field. In the transmitting direction from the base station to the two-way communication device 31, the destination address field specifies the unique address for the receiving two-way communication device 31. The source address field in the transmitting direction from the base station to the two-way communication device 31 specifies the base station identification address, which may change to account for base station rerouting in the event that two-way communication device roaming is allowed. In the transmitting direction from the two-way communication device 31 to the base station during a reply session, the source address field contains the two-way communication device 31 address to permit the base station to identify the reply pages transmitted to a previously sent page.

The date/time stamp field contains data reflecting the second, minute, hour, day, month and year of the transmitted packet. The date/time stamp information allows the base station to determine to send a time-out message to the individual initiating the page request in the event that the two-way communication device 31 does not timely acknowledge receipt of the page message. The cyclic redundancy check (CRC) field allows the two-way communication device 31 to verify the integrity of the messages received and transmitted by the two-way communication device 31. The data status includes coherency information enabling the host computer and the computer of FIG. 1 to synchronize data. The data status field carries information such as whether the data has been modified, the staleness of the data, the replacement status of the data, among others. The data field is a variable length field which allows variable length messages to be transmitted to and from the two-way communication device 31.

In the two-way paging embodiment using the two-way communication device 31, the user can be paged and can reply as well. A page originator wishing to send an alphanumeric page to the user of the computer system of FIG. 1 places a call using a telephone or an originating computer. The telephone interface routes the call to the base station. The computer at the base station will either digitally or verbally query the page originator to enter an identification number such as a telephone number of the two-way communication device 31. After entry of the identification, the base station computer further prompts the page originator for the message to be sent as well as the reply identification number, or the call-back number. Upon receipt of the paging information, the base computer transmits a page message to the computer system with the two-way communication device 31 of FIG. 1, which may reply using predetermined text templates, or more flexibly using keyboard, voice, handwriting, sketching or drawing, as discussed in the incorporated by reference U.S. patent application Ser. No. 08/684,842, entitled "GRAPHICAL DATA ENTRY SYSTEM."

Preferably, the present invention is compatible with Always-On-Always-Connected (AOAC) mobile clients connected to the Internet via wireless communications. The wireless messaging networks based on GSM/SMS, pACT, Reflex, and similar narrowband 2-way paging services are significantly different from existing packet networks in that (1) Packet sizes are small (typically around 100 bytes); (2) Typical latency is much longer (on the order of seconds to minutes); and (3) The connection is much more intermittent. Narrowband sockets (NBS) was created to overcome these limitations by providing fragmentation and reassembly, reliability, and tolerance for intermittency to compliment circuit switched connections with low bandwidth connections over wireless messaging networks. The NBS enables a new class of mobile usage, AOAC, with exciting applications like automatic (background) forwarding of email, up to date news, weather, traffic, and personal messaging. It enables the existing cellular and wireless messaging infrastructure to send arbitrary data, rather than just alphanumeric pages. Thus, the present invention, in conjunction with NBS, allows data to find the user, rather than the user always having to initiate the retrieval for the information.

The Datagram Protocol for NBS is a general purpose, unreliable, connectionless datagram service. It is not intended for applications which require 100% reliable delivery, such as file transfers. NBS datagrams are usually formatted to be readable on devices without NBS. This is useful for sending text based messages to legacy pagers and voice phones NBS has a core set of required features that must be supported in order to provide consistent functionality to developers. However, each narrowband network has different features and header formats. The NBS stack will use existing transport features to implement these core requirements were possible. The NBS stack performs queries to the hardware interface (NB-SERIAL NDIS miniport) for available network features. If required features such as ports and fragmentation are not supported by the network, then the NBS stack adds these features to the payload of each message. Datagram packets are transferred using the message services of an underlying network, where typically the bandwidth is small and communication is wireless. The protocol assumes the device addressing (Destination Address and the Originating Address) is handled at a higher level, and only adds those features necessary (generally port level addressing and fragmentation). In order to implement a NBS datagram protocol the following fields are necessary: DstPort—The logical port of the destination application (dd); SrcPort—the logical port of the sender application (as in UDP) (oo); RefNum—the sequence number of the datagram (kk); MaxNum—the total number of fragments in a single datagram (mm); SeqNum—the sequence number of the fragment, inside the datagram (nn). The datagram protocol headers are part of the data segment of the NBS message fragment. The headers can be presented in a few formats, depending on the environment used. In the Windows environment, the NBS stack queries the hardware driver (through NDIS) for the current network and packet format. Messages sent shall primarily use the binary format, or the full text based header including the concatenation scheme.

The processor 20 of the preferred embodiment accepts handwritings as an input medium from the user. A digitizer 34, a pen 33, and a display LCD panel 35 are provided to capture the handwriting. Preferably, the digitizer 34 has a character input region and a numeral input region which are adapted to capture the user's handwritings on words and numbers, respectively. The LCD panel 35 has a viewing screen exposed along one of the planar sides of the enclosure are provided. The assembly combination of the digitizer 34, the pen 33 and the LCD panel 35 serves as an input/output device. When operating as an output device, the screen 35 displays computer-generated images developed by the CPU 20. The LCD panel 35 also provides visual feedback to the user when one or more application software execute. When operating as an input device, the digitizer 34 senses the position of the tip of the stylus or pen 33 on the viewing screen 35 and provides this information to the computer's processor 20. In addition to the vector information, the present invention contemplates that display assemblies capable of sensing the pressure of the stylus on the screen can be used to provide further information to the CPU 20.

The preferred embodiment accepts pen strokes from the user using the stylus or pen 33 which is positioned over the digitizer 34. As the user "writes," the position of the pen 33 is sensed by the digitizer 34 via an electromagnetic field as the user writes information to the data management computer system. The digitizer 34 converts the position information to graphic data that are transferred to a graphic processing software of the data logger computer system. The data entry/display assembly of pen-based computer systems permits the user to operate the data logging computer system as an electronic notepad. For example, graphical images can be input into the pen-based computer by merely moving the stylus over the surface of the screen. As the CPU 20 senses the position and movement of the stylus, it generates a corresponding image on the screen to create the illusion that the pen or stylus is drawing the image directly upon the screen. The data on the position and movement of the stylus is also provided to a handwriting recognition software, which is stored in the ROM 21 and/or the RAM 22. The handwriting recognizer suitably converts the written instructions from the user into text data suitable for saving time and expense information. The process of converting the pen strokes into equivalent characters and/or drawing vectors using the handwriting recognizer is described below.

With suitable recognition software, text and numeric information can also be entered into the pen-based computer system in a similar fashion. For example, U.S. Pat. No. 5,463,696, issued on Oct. 31, 1995 to Beernink et al., and hereby incorporated by reference, discloses a technique for analyzing and interpreting cursive user inputs to a computer, such as strokes or key depressions to the computer system. Inputs to the system are received at a user interface, such as a dual function display/input screen from users in the form of pen strokes or gestures. A database stores cursive input data strokes and hypotheses regarding possible interpretations of the strokes. Recognition of the input strokes and recognition of higher level combinations of strokes forming characters and words is performed using recognizers, or recognition domains, each of which performs a particular recognition task. A controller is provided for controlling the hypotheses database and for scheduling the recognition tasks in the recognition domains. Arbitration resolves conflicts among competing hypotheses associated with each interpretation. The recognition domains, or recognizers generate two or more competing interpretations for the same input. The recognizers use a data structure called a unit, where a unit is a set of sub-hypotheses together with all their interpretations generated by a single recognizer.

In Beernink, the handwriting recognizer operates at a first level for identifying one or more groups of related sub-hypotheses using grouping knowledge. These grouped sub-hypotheses generate a unit with no interpretations for each group and store the unit in the database in what is called a piece-pool memory. The Beernink recognizer has a second level of operation where each unit generated in the grouping stage is classified to provide the unit with one or more interpretations. The classified units are stored in a unit pool memory. Two or more interpretations of the input data are combined in a hierarchical structure according to a predetermined scheme in successive steps to form higher level interpretations.

Although the Beernink recognizer is flexible and does not require that the user learns special gestures, its accuracy is not perfect. Because the letters in a cursive-lettered word are connected, the recognizer must guess at how to segment the strokes into individual characters. Since ambiguities exist even in stellar samples of penmanship, cursive handwriting recognizers such as those in Beernink face a challenging task in deciphering handwritings. For example, handwriting recognizer have difficulties in trying to determine where a cursive lower-case "n" and "m" begin and end when the two letters, distinguishable from one another only by their number of humps, are strung together in a word. The handwriting recognizer tackles such ambiguities by looking in its dictionary-to determine, for instance, which words have "m" before "n" and which have "n" before "m." The user can improve accuracy by writing characters further apart than usual, but that is inconvenient and contrary to the way humans write.

Preferably, the handwriting recognizer of the present invention recognizes non-cursive characters. Unlike the Beernink approach to recognizing handwriting in which the user can print or write cursively, the non-cursive handwriting recognizer requires the user to learn to print characters in its fixed style using a basic character set, preferably a 36-character alphanumeric character set. In addition to the basic 26 letters and 10 digits, the non-cursive handwriting recognizer includes multi-step pen strokes that can be used for punctuation, diacritical marks, and capitalization. Preferably, the non-cursive handwriting recognizer is a software module called GRAFFITI, commercially available from U.S. Robotics, Palm Computing Division, located in Los Altos, Calif. Each letter in the non-cursive alphabet is a streamlined version of the standard block character—the letter A, for example, looks like a pointy croquet hoop, and the hoop must be started at the dot indicator at the lower right corner—as illustrated and discussed in more detail in the above incorporated-by-reference U.S. patent applications. By restricting the way the user writes, the non-cursive handwriting recognizer achieves a more perfect recognition and, as with stenography, supports an alphabet consisting of characters that can be written much more quickly than conventional ones.

The computer system is also connected to one or more input/output (I/O) ports 42 which allows the CPU 20 to communicate with other computers. Each of the I/O ports 42 may be a parallel port, a serial port, or alternatively a proprietary port to enable the computer system to dock with the host computer. In the event that the I/O port 42 is housed in a docking port 84 (FIG. 5), after docking, the I/O ports 42 and software located on a host computer 82 (FIG. 5) support an automatic synchronization of data between the computer system and the host computer. During operation, the synchronization software runs in the background mode on the host computer 82 and listens for a synchronization request or command from the computer system 10 of the present invention. Changes made on the computer system and the host computer will be reflected on both systems after synchronization. Preferably, the synchronization software only synchronizes the portions of the files that have been modified to reduce the updating times.

The I/O port 42 is preferably a high speed serial port such as an RS-232 port, a Universal Serial Bus, or a Fibre Channel for cost reasons, but can also be a parallel port for higher data transfer rate. Preferably, the I/O port 42 has a housing which is adapted to snappably connect to the housing of a Musical Instrument Digital Interface (MIDI) player 37, a fax modem 40, a voice recorder 43, a GPS receiver 46 and a barcode reader 48. When the I/O port 42 is connects to the MIDI player 37, the computer system 10 drives high quality audio speakers 38 and 39 which connect to the MIDI player 37 to support multimedia applications on the computer 10.

Originally developed to allow musicians to connect synthesizers together, the MIDI protocol is used in generating sound for games and multimedia applications. One advantage of MIDI is storage space, as MIDI data files are quite small when compared with sampled audio sounds. The reduction in storage space follows from the fact that MIDI file does not contain sampled audio data, but the instructions needed by a synthesizer to play the sound. Other advantages of MIDI is the ability to edit the file or to change the speed, pitch or key of the sound. The output of the MIDI player 37 is provided to an external multi-timbral MIDI synthesizer which can play many instruments such as piano, bass and drums simultaneously. The output of the MIDI player 37 can be connected to the synthesizer by wire or wirelessly such as by the infrared communication. In this manner, the MIDI player 37 generates high quality sound to enhance the user experience.

Additionally, via the serial port 42, a fax-modem 40 is adapted to receive information over a telephone 41 via a plain old telephone system (POTS) landline or over the radio frequencies and allow the user to access information untethered. Further, the modem 40 may serve as part of a wide-area-network to allow the user to access additional information. The fax-modem 40 can receive drawings and text annotations from the user and send the information over a transmission medium such as the telephone network or the wireless network to transmit the drawings/text to another modem or facsimile receiver, allowing the user to transmit information to the remote site on demand. The fax-modem 40 can be implemented in hardware or in software with a few additional components such as a DAA, as is known in the art. Preferably, the fax-modem 40 is a 56 kbps modem using Lucent Technology's DSP1643, a member of the Apollo™ modem chip set. The Lucent Technology's modem chips are designed to accommodate software upgrades for future enhancements to V.flex2 technology from Lucent, so customers' investments will be protected as standards for 56 kbps modems evolve. Using the device, the present invention can achieve Internet connections at rates up to 56 kbps when both they and their Internet service providers (ISPs) and online service providers (OSPs) use modems that incorporate V.flex2 compatible modems. Alternatively, the fax-modem device 40 can be a two-way communication device which can receive text messages and graphics transmitted via radio frequency to the user for on-the-spot receipt of messages.

The I/O port 42 can also receive a voice recorder 43. Although voice can be captured, digitally processed by the DSP 23 or the CPU 20, stored internally in the RAM 22 for conversion into text or inclusion in a document or a file to be transmitted via a suitable network such as the Internet to a remote site for review, as discussed below, voice data can be stored externally and more economically using the voice recorder 43 which stores audio information in its own storage rather than the RAM 22 and thus can operate independently of the computer system of FIG. 1. Preferably, the voice recorder 43 is an ISD33240 from Information Storage Devices Inc. in San Jose, Calif. The voice recorder 43 captures analog sound data and stores the analog signals directly into solid state electrically erasable programmable ROM (EEPROM) memory cells which have been adapted to store 256 different voltage levels per cell. As the voice recorder 43 captures voice and audio signals directly into its EEPROM cells, the analog to digital conversion process is not needed. The CPU 20 communicates with the voice recorder 43 by sending the voice recorder 43 an address along with other control signals to the voice recorder 43. In this manner, the CPU 20 can control the location where sound is to be played and/or recorded. Furthermore, as the voice recorder 43 can operate even when it is detached from the computer system of the present invention, the user can simply separate the computer system and carry only the voice recorder 43 when necessary.

The voice recorder 43 is connected to the processor 20 via the I/O port 42. The I/O port 42 is connected to the CPU 20 via the bus and can forward commands from the processor 20 to the voice recorder 43. Preferably, the voice recorder 43, the microphone 44 and the speaker 45 are located in an external housing which snappably connects to the housing of the computer 10. Through the I/O port 31, the voice recorder 43 could be commanded by the CPU 20 to play or record audio segments at specific cell addresses when particular conditions are met. Furthermore, via a message management record as known to those skilled in the art, the CPU 20 allows the ability to perform on-the-fly edit, delete, or supplement messages stored by the voice recorder 43.

Although the voice recorder is normally controlled by the CPU 20, the voice recorder 43 also has one or more switches (not shown) to allow the user to manually operate the voice recorder 43 in the event that the voice recorder 43 has been ejected from the computer system. The switches provide user selectable options which include: "Goto Begin", "Skip to Next", "Record", "Stop", "Play Next", "Play Last." In this manner, even when the voice recorder 43 is separated from the computer of the present invention, the user can still use the voice recorder 43 in a stand-alone mode.

Additionally, a global position system (GPS) receiver 46 is connected to the I/O port 42 to sense the physical position of the user. The GPS receiver 46 senses positional data from a constellation of 24 satellites orbiting around the earth such that four satellites are visible at a time. The GPS receiver 46 provides a stream of data to the processor 20 which includes latitude, longitude, elevation and time information. The GPS receiver 46 is available from a number of sources, including NavTech Corporation and Rockwell International Corporation.

Furthermore, a wand or a bar-code reader 48 can be removably attached to the I/O port 43 to allow the data management computer of the present invention to read bar codes. The wand is a pen-type of scanner that requires physical contact with the bar code when scanning. In contrast, a laser bar code scanner is a non-contact scanner which uses a laser beam to read a bar code. Due to the active laser power, the laser bar code scanner is better at reading bar codes from a distance or when the bar code itself is poorly printed. The bar code reader 48 is snappably attached to the I/O port 31 such that the barcode reader 48 can be quickly attached and removed, as necessary. The barcode reader 48 captures the bar-code information from a barcoded label and converts the optically encoded information to serial data before they are transmitted to the computer of FIG. 1. Alternatively, the present invention contemplates that the wired link can be replaced by a wireless link such as radio or infrared. In such instances, the barcode reader 48 has an additional transceiver, which may be either radio-based or infrared based, and which can transmit captured data to the computer of FIG. 1 for subsequent processing.

Additionally, an infrared transceiver 49 can be connected directly to the bus of the computer 10 or to the I/O port 31 (not shown) to provide an infrared link to a nearby personal computer which is equipped with a corresponding infrared transceiver. The infrared transceiver is available from suppliers such as Hewlett-Packard, IBM, or Siemens. In the event that the IR transceiver 49 is directly connected to the bus of the computer system 10, the transceiver 49 provides the received optical data to a Universal Asynchronous Transmitter/Receiver (UART) which converts the data into a suitable format for the bus.

Additionally, to improve the ease of reading from the small screen 35 of the computer of the present invention, a remote, large display device 52 is wirelessly linked to the computer 10 via the IR transceiver 49 or a radio transceiver 31. The large display device 52 can be a suitably equipped television receiver with a wireless link and a video generator, as discussed further in FIG. 3, or it can simply be the display of a conventional personal computer having a matching transceiver. The large display device 52 thus enlarges the characters on to an easier to read display. Additionally, the large display device 52 can offer higher resolution than available through the LCD display 35. In such case, the computer 10 is suitably informed so that software running on the computer 10 can change its display interface to take advantage of the higher resolution, as discussed in FIG. 19.

In addition to the large display device 52, the present invention also supports remote stereo amplifier 93 and speakers 94 and 95 to provide a total multimedia experience to the user, even if the hand-held computer 10 cannot support high power amplifiers and speakers onboard. In the remote stereo 93, a receiver is provided to receive data transmission from either the IR transceiver 49 or the wireless transceiver 31. Preferably, the stereo amplifier is a MIDI compatible synthesizer or sound module. The MIDI protocol provides an efficient format for conveying musical performance data. Due to MIDI's more efficient data storage format, only a portion of the bandwidth of the transceivers 31 and 49 need be used to transmit MIDI instruction streams. The MIDI data stream is a unidirectional asynchronous bit stream at 31.25 kbits/sec with 10 bits transmitted per byte. The remote stereo 93 in turn can consist of a MIDI sequencer, which allows MIDI data sequences to be capture, stored, edited, combined, and replayed. The recipient of the MIDI data stream is provided to a MIDI sound generator which responds to the MIDI messages by playing sounds. The present invention also contemplates more elaborate remote stereo MIDI setups, where the music can be composed to have different parts for different instruments. Furthermore, in this set-up, a different sound module is used to play each part. However, sound modules that are capable of playing several different parts simultaneously, or multi-timbral, can still be used. To allow realistic sounds to be reproduced, the stereo 93 drives a pair of speakers 94 and 95. In the manner discussed, the remote stereo unit 93 receives MIDI commands from the processor 20 and plays high quality sound on the speakers 94 and 95.

In addition to the handwriting recognizer previously discussed, voice recognition can be used in conjunction with and/or replace the handwriting recognizer of the present invention. As shown in FIG. 1, a microphone 51 is connected to an analog to digital converter (ADC) 150 which interfaces with the central processing unit (CPU) 20. Furthermore, a speech recognizer is stored in the ROM 21 and/or the RAM 22. The speech recognizer accepts the digitized speech from the ADC 150 and converts the speech into the equivalent text. As disclosed in U.S. application Ser. No. 08/461,646, filed Jun. 5, 1995 by the present inventor and hereby incorporated by reference, the user's speech signal is next presented to a voice feature extractor which extracts features using linear predictive coding, fast Fourier transform, auditory model, fractal model, wavelet model, or combinations thereof. The input speech signal is compared with word models stored in a dictionary using a template matcher, a fuzzy logic matcher, a neural network, a dynamic programming system, a hidden Markov model (HMM), or combinations thereof. The word model is stored in a dictionary with an entry for each word, each entry having word labels and a context guide. Next, a word pre-selector receives the output of the voice feature extractor and queries the dictionary to compile a list of candidate words with the most similar phonetic labels. These candidate words are presented to a syntax checker for selecting a first representative word from the candidate words, as ranked by the context guide and the grammar structure, among others. The user can accept or reject the first representative word via a voice user interface. If rejected, the voice user interface presents the next likely word selected from the candidate words. If all the candidates are rejected by the user or if the word does not exist in the dictionary, the system can generate a predicted word based on the labels. Finally, the voice recognizer also allows the user to manually enter the word or spell the word out for the system. In this manner, a robust and efficient human-machine interface is provided for recognizing speaker independent, continuous speech and for converting the verbal instructions from the user into text data suitable for data management purposes.

The casing design and layout of the shell for the computer of FIG. 1 are discussed next. Preferably, the case is a rectangular plastic casing with a major opening on the top of the case to receive the LCD panel 35 and the digitizer 34. The case has a receptacle which is adapted to receive and store the pen 33. Furthermore, a plurality of push-buttons in the keypad 24 are positioned on the top side of the case. The push-buttons of the keypad 24 preferably allows the user to invoke one or more pre-installed software on the computer of FIG. 1. Additionally, the case has an opening on the backside which is adapted to receive a connector carrying the electrical impulses to and from the I/O port 42. To electrically access the I/O port 42, a Snap-On block which interlocks with the bottom of the computer and which is electrically connected to the I/O port 42. As noted above, the casing for FIG. 1 is resembles the Pilot handheld computer available from Palm Computing—US Robotics.

Figure 2A:
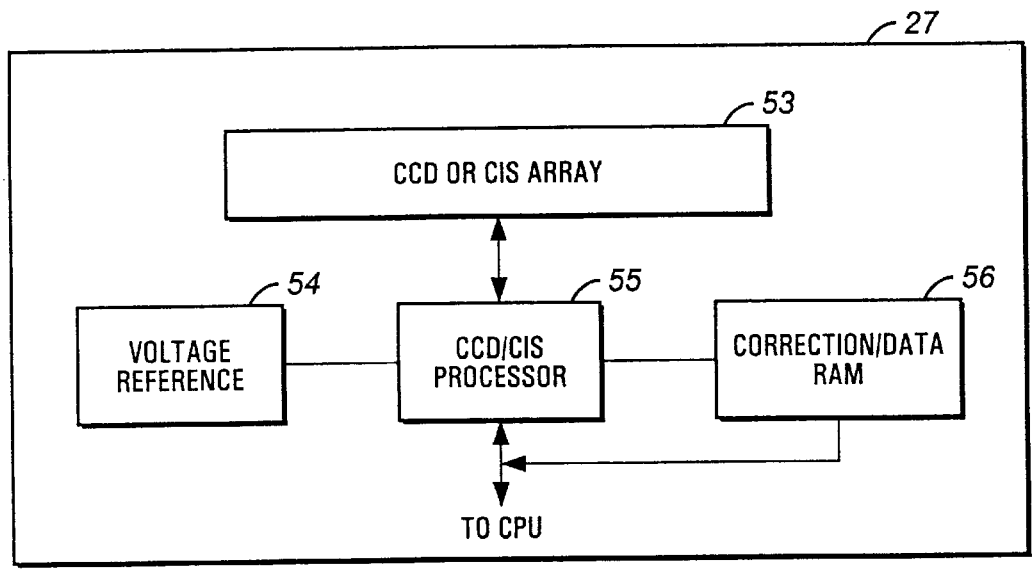
FIG. 2A is a block diagram showing in more detail a scanner from FIG. 1.

Referring now to FIG. 2A, a block diagram of the CCD unit 27 is shown in more detail. In FIG. 2A, a CCD or CIS array 53 is connected to a CCD/CIS processor 55. The CCD/CIS processor 55 is connected to a voltage reference 54 as well as an optional correction/data RAM 56 which can be eliminated for cost saving reasons. The CCD sensor may be a TCD1250D, a MN3610H or a similar CCD. Alternatively, CIS sensors such as those available from Dyna Image Corporation may be used. The CCD/CIS processor 55 is preferably a LM9801 IC from National Semiconductor, Inc. (Santa Clara, Calif.) which linearizes the pixel stream from the CCD/CIS array in the analog domain and further provides correlated double sampling for black level and offset compensation. The output of the CCD/CIS processor 55 is provided to the bus to be presented to the processor 20.

Figure 2B:
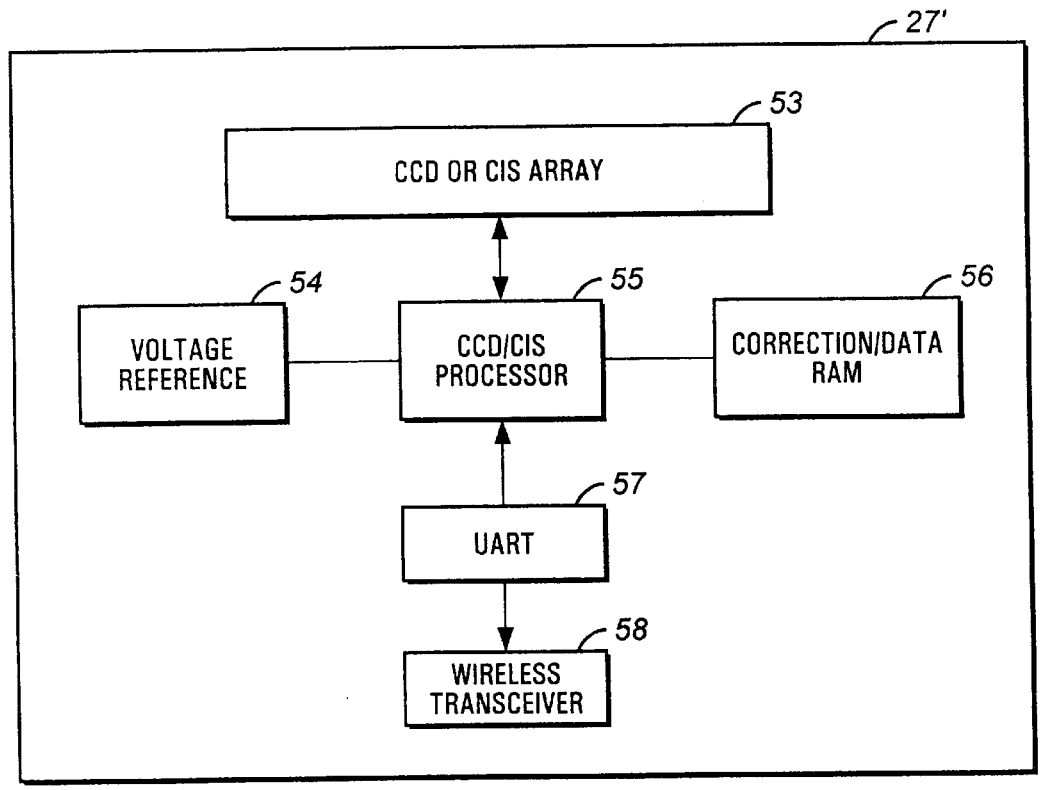
FIG. 2B is a block diagram showing in more detail another scanner for the computer system of FIG. 1 having a wireless link.

Turning now to FIG. 2B, a wireless scanner 27' is shown. In this unit, a wireless transceiver 58 is connected to a Universal Asynchronous Receiver/Transmitter (UART) 57, which is in turn connected to the CCD/CIS processor 55, as previously discussed in FIG. 2A. The UART 57 serializes data regarding the scanned image and presents the data to the wireless transceiver 58 for transmitting back to the computer 10 of FIG. 1. The wireless transceiver 58 can be an infrared unit for communicating with the IR transceiver 49 of the computer 10. Alternatively, the wireless transceiver 58 can be a radio-based unit for communicating with the wireless transceiver 31 of FIG. 1. In this manner, the scanner 27' does not have to be physically connected to the computer 10, thus providing more convenience and flexibility for the user during use. Although the use of the CCD/CIS processor 55 is disclosed, the present invention contemplates that, to cut cost, a operational amplifier, an analog to digital converter, and software running on the CPU 20 to compensate for scanning related signal noise are all that is needed to implement a low cost scanner system. Furthermore, although gray-scale CCD/CIS devices are preferred for cost reasons, the present invention contemplates that color CCD devices may be used as well.

Figure 3:
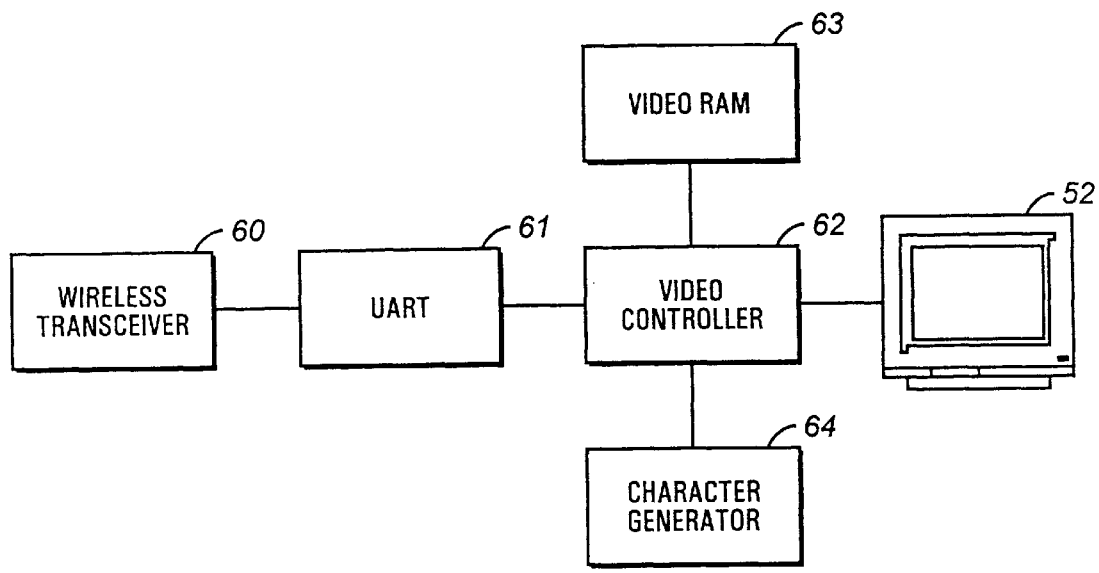
FIG. 3 is a block diagram showing a remote display unit with a wireless link which is adapted to communicate with the computer system of FIG. 1.

Referring to FIG. 3, a video driver and a large screen cathode ray tube (CRT) 52 is provided to deliver ease of reading information from the small mobile computer 10 is shown. Although the TV is not recommended for computing functions such as CAD/CAM, it is suitable for playing games and browsing the Internet. In FIG. 3, high level primitives of the display data is transmitted using a suitable media such as infrared or radio wave from the computer 10 to the CRT, preferably a television display unit commonly available to consumers. The high level primitive data transmitted, including characters and form definitions, is received by a wireless transceiver 60 and is presented to a UART 61 for conversion into parallel data. The data is presented to a video processor or controller 62 which is connected to a video RAM 63 and a character generator 64 for rasterization into bit-maps. The bit-mapped display data is delivered to a triple digital to analog converters (DACs) in the video controller 62 which generate suitable color RGB video signals. The video signal is provided into driver electronics for generating a composite video signal to be delivered to the video input of the TV. Furthermore, sound primitives are converted and delivered to an audio amplifier which drives the left and right audio inputs of the TV. In this manner, users with advanced age can have the benefits of reading ease and small factor portability. Alternatively, in the event that the user is within range of a computer, the high level video and sound primitives can be sent via the wireless network such as the infrared transmission (IrDA) and subsequently rasterized by the processor of the desktop computer to be displayed on the desktop display for ease of reading. Additionally, in the event that the user wishes to drive a VGA monitor directly in place of the TV, a VGA graphics adapter may be used. Furthermore, a scan converter may be attached to the VGA adapter to generate the NTSC/PAL video signal. In performing the conversion from computer video to TV, VGA frequency is roughly twice that of the video frequency. Furthermore, computer VGA displays tend to be progressively scanned (non-interlaced) while TV video uses interlaced video, a remnant of the NTSC video scheme. However, since a strict translation of VGA to NTSC may produce flicker, the preferred embodiment provides an adaptive finite impulse response filter and highly linear D/A and A/D converters to minimize flickers.

Figure 4:
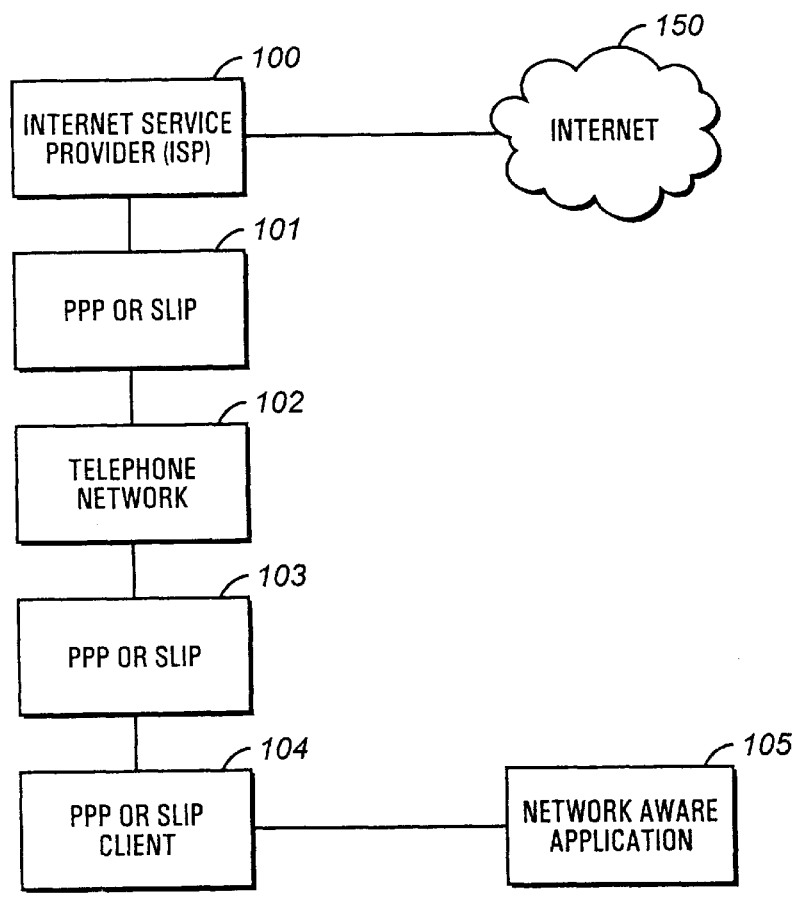
FIG. 4 shows a block diagram showing in more detail protocol layers linking a network aware application operating on the computer of FIG. 1 and another application over the Internet.

Turning now to FIG. 4, the major protocol layers for connecting the computer of FIG. 1 to a suitable network such as an Internet 150 is shown. In FIG. 4, the user has connected to a suitable Internet service provider (ISP) 100 which in turn is connected to the backbone of the Internet 150, typically via a T1 or a T3 line. The ISP 100 communicates with the computer of the present invention via a protocol such as point to point protocol (PPP) or a serial line Internet protocol (SLIP) 100 over one or more media or telephone network 102, including landline, wireless line, or a combination thereof. On the portable computer side, a similar PPP or SLIP layer 103 is provided to communicate with the ISP 100 computer. Further, a PPP or SLIP client layer 104 communicates with the PPP or SLIP layer 103. Finally, a network aware application 105 such as a browser or a spreadsheet with Internet capability of the present invention receives and formats the data received over the Internet 150 in a manner suitable for the user.

Figure 5:
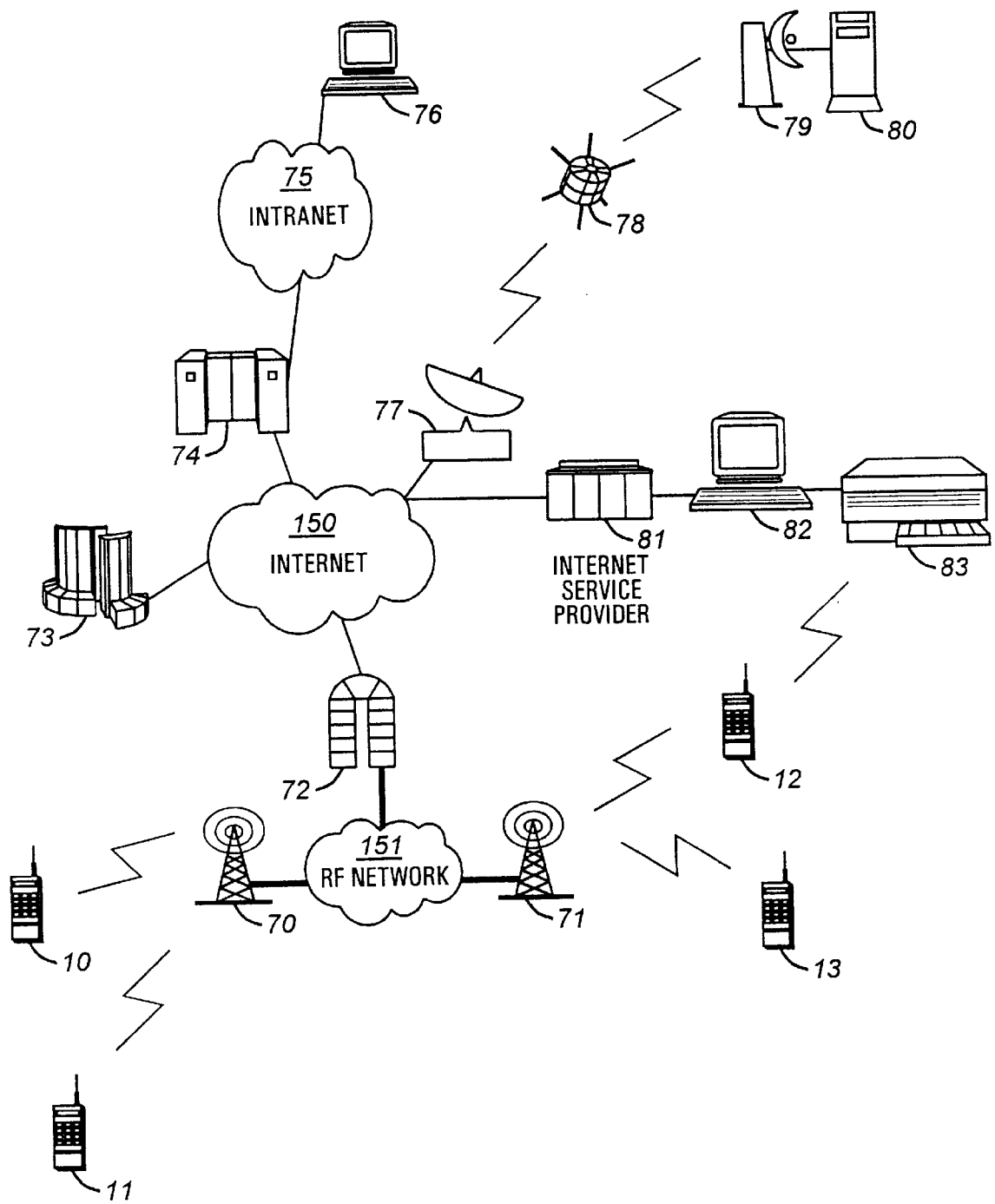
FIG. 5 is an illustration of a connectivity architecture of the computer system of FIG. 1 and the Internet as well as the data flow among computers connected to the Internet and the computer system of FIG. 1.

Turning now to FIG. 5, a typical Internet system is shown with one or more portable computers 10, 11, 12, and 13 shown dispersed in nearby cell regions. Computers 10 and 11 are located in one cell and communicate with a cell mobile support station (MSS) 70. Similarly, computers 12 and 13 communicate with a cell mobile support station 71. MSS stations 60 and 61 are connected to a radio frequency (RF) network 151 which relays the messages via stations positioned on a global basis to ensure that the user is connected to the network, regardless of his or her reference to home. The RF network 151 eventually connects to a gateway 72 which is in turn connected to the Internet 150. The gateway 72 provides routing as well as reachability information to the network such as the Internet 150. A plurality of large scale computing resources such as a supercomputer 73 and a mainframe 72 are connected to the Internet 150. The mainframe 52 in turn is connected to an corporate version of the Internet called Intranet 54 which supplies information to one or more office computers or workstations 55.

The Internet 150 is a super-network, or a network of networks, interconnecting a number of computers together using predefined protocols to tell the computers how to locate and exchange data with one another. The primary elements of the Internet 150 are host computers that are linked by a backbone telecommunications network and communicate using one or more protocols. The most fundamental of Internet protocols is called Transmission Control Protocol/Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet 150. As packets of information travel across the Internet 150, routers throughout the network check the addresses of data packages and determine the best route to send them to their destinations. Furthermore, packets of information are detoured around non-operative computers if necessary until the information finds its way to the proper destination.

Although the Internet 150 provides a pathway for users to communicate and share information, the original user interface had been rather unfriendly. Eventually, a system was developed to link documents stored on different computers on the Internet 150. Known as a World Wide Web, the system is an elaborate distributed database of documents, graphics, and other multimedia development. Like other distributed applications, the Web is based on a client/server model where Web pages reside on host computers that "serve up" pages when the user's computer (client computer) requests them. As the user "surfs" the Web, a browser can request data from the database on a server computer that processes and replies the desired data back to the computer system of FIG. 1 and to display that request when the request is fulfilled by the server. The client computer runs a browser software which asks for specific information by sending a HTTP request across the Internet 150 connection to the host computer. When the host computer receives the HTTP request, it responds by sending the data back to the client.

The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows a more efficient Internet access as it saves bandwidth and improves access performance significantly. The browser also interprets HyperText Markup Language (HTML) which allows web site creators to specify a display format accessible by HTML compatible browsers.

Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user.

To supply more intelligent processing of information over the Internet 150, a language such as Java may be utilized.

Java was developed originally by Sun Microsystems of Mountain View, Calif. The specification for the Java language is stored at the Java web site http://java.sun.com/. The web site contains the Java development software, a Hotlava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader'se machine. In Java, the compiler takes the instructions and generates bytecodes, which are system independent machine codes. A bytecode interpreter executes the bytecodes. The bytecode interpreter can execute stand-alone, or in the case of applets, the bytecode interpreter is built-in Java compatible browsers. Thus, with a Java compatible client-server, the Internet 150 is transformed from a passive giant book of information into an active network capable of supporting electronic commerce and virtual ecosystems.

Although the supercomputer 51, the mainframe computer 52 and the gateway 59 are shown in FIG. 4 as being connected to the Internet 150 via landlines such as T1 and T3 lines, the Internet may be connected to a satellite transmission system 56 which transmits and receives high bandwidth data over a satellite 57. The satellite 57 in turn relays the information to one or more local stations 58 which is connected to one or more servers 57. Thus, as shown in FIG. 3, the portable computer 10 can easily request information from a variety of sources which may exist locally or on the other side of the world via the Internet 150.

An important goal of the personal computer 10 is its ability to allow users to move about freely within and between cells while transparently maintaining all connections, particularly with the Internet 150. However, the Internet 150 suite of protocols had been designed with an assumption that each user is assigned a fixed Internet 150 address associated to a fixed location. Thus, for mobile computers with a wireless physical link, the movement or migration of users in the wireless network violates the implicit Internet 150 protocol. As wireless bandwidth is at a premium, particularly when voice and video data are involved, it is inefficient to require end-to-end retransmission of packets as done in TCP. Furthermore, due to the unpredictable movements of mobile computers with wireless links, large variations exist in the available bandwidths in each cell and affect the transmission characteristics between the mobile computer 10 and the Internet 150.

In the preferred embodiment, a number of virtual circuits are used within the mobile network to route connections to mobile computers 10–13 via MSS 70 and 71. In the preferred embodiment, every mobile computer 10–13 has a globally unique virtual Internet protocol (VIP) address and a IP address which is assigned by the gateway 72 or the MSS 70 or 71. Furthermore, each of the MSS 70 and 71 has a VIP as well as a fixed IP address. Each of the MSS 70 and 71 also tracks all mobile nodes within its domain or cell range. The connection from a remote endpoint on the Internet 150 to the mobile computer 10 terminates at the fixed IP of the MSS 70 or 71. The MSS 70 and 71 maintains a cache of time-stamped VIP to IP mappings, also called an address mapping table. Whenever the mobile computer 10 moves from one MSS 70 to another MSS 71, the address mapping table is updated. During the table update, all packets destined to the mobile computer 10 continues to be sent to the old MSS 70. These packets are returned to the sender, who forwards the returned message to the new MSS 71. Thus, based on the address mapping table, the sender and the MSS 70 or 71 can route packets to the mobile computer 10.

To illustrate the operation of the VIP, events associated with the delivery of a packet of data to the mobile computer 10 is discussed next. The MSS 70 buffers the incoming packet and forwards the packet to the known or predicted cell covering the mobile computer 10. Once received, the mobile computer 10 acknowledges receipt and requests the MSS 60 to discard the packet. Alternatively, in the event that the mobile compute 10 has moved to another cell which is covered by the MSS 71, it is assigned a new IP address. The mobile computer 10 sends the new IP address and the VIP address to its home gateway 72, which in turn sends the new IP address to intermediate gateways to update their address mapping tables as well. The MSS 70 continues to send packets to the mobile computer 10 until either the connections are closed or until the MSS 71 sets up its own connection via the address mapping table with the remote endpoint having the open connection with the mobile computer 10.

To address the problems associated with a bandwidth variations caused by the wireless environment, the MSS 70 or 71 preferably provides a loss profile transport sub-layer which determines the appropriate disposition of the data, based on markers placed on the packet by the sender and based on the available bandwidth negotiated between the MSS 70 and 71 and the mobile computers 10, 11, 12 or 13. Typically, redundant non-critical data such as every other frames of a video clip may be appropriately edited by rearranging, clipping or compressing the data at the MSS 70 or 71 end before transmitting to the mobile computer 10, 11, 12 or 13 in the event that the bandwidth is severely constrained.

Figure 6:
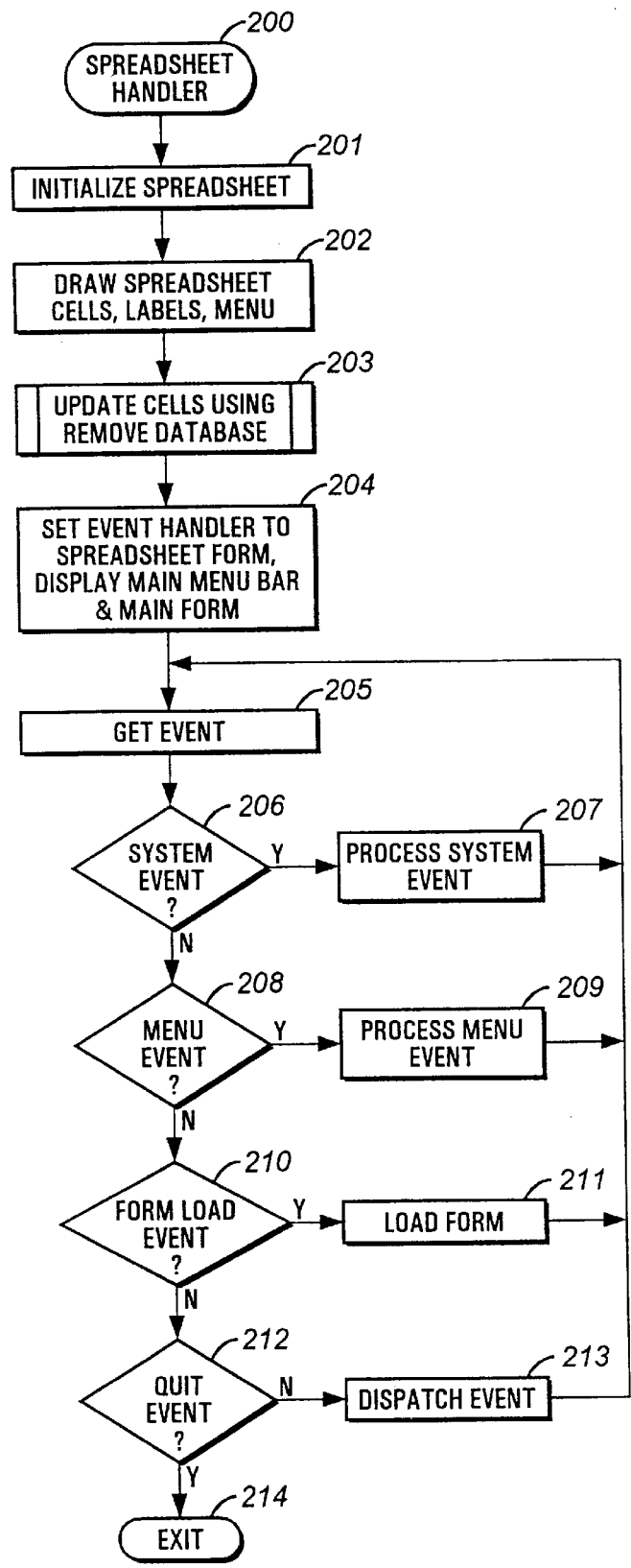
FIG. 6 is a flowchart illustrating the process for handling events in a spreadsheet data management system in the computer system of FIG. 1.

As indicated earlier, a number of software modules may reside in the RAM 22 to provide added functionality to the portable computing appliance. For instance, the portable computing appliance may provide a sketching system in the incorporated by reference Application entitled "GRAPHICAL DATA ENTRY SYSTEM" may be provided to support fast, convenient and accurate annotated drawings in the field. Additionally, a spreadsheet and database engine may be used to support the analysis of data captured from a number of sources over the Internet 150. FIG. 6 illustrates in more detail the spreadsheet of the present invention. The spreadsheet of the present invention is essentially a list of memory locations or data storage cells that are related, or linked together. Preferably, the data storage cells are organized using a linked list for ease of traversal. Further, the data storage cells can be specified using row and column identifiers. Preferably, the cells of the spreadsheet are linked using dynamic rows and columns. The ability to offer both dynamic rows and columns simplifies and reduces the data storage requirement on the system RAM 22. The spreadsheet provides the user of the handheld computer with on-the-fly data processing capability. The spreadsheet can also acquire data via the barcode scanner 48, the CCD unit 27 and OCR software, or alternatively via the microphone 51, ADC 50 and a speech recognizer. Furthermore, the spreadsheet can deploy with intelligent agents to seamlessly hunt for information relevant to the user's needs. In this manner, the spreadsheet of the present invention turns the handheld computer system of the present invention into an intelligent data management system which can acquire and process data on the fly.

Turning now to FIG. 6, a spreadsheet handler 200 is shown. In FIG. 6, from the step 200, the spreadsheet handler initializes the spreadsheet in step 201. Such initialization includes the clearing of the spreadsheet memory and the setting of the current row to "1" and column to "A". Next, in step 202, the spreadsheet handler 200 of FIG. 6 draws the spreadsheet cells and displays the row/column labels as well as the menu. The spreadsheet handler 200 then proceeds to check in step 203 whether certain cells of the spreadsheet need to be updated using a remote data source such as an Internet database. Step 203 is illustrated in more detail in FIG. 14.

From step 203, the routine of FIG. 6 proceeds to set an event handler to the spreadsheet form in step 204. From step 204, the routine waits for an event in step 205. Once the event is received, the routine of FIG. 6 tests to see if the event is a system event in step 206. If so, the routine processes the system in step 207 before it loops back to step 205 to process the next event.

Alternatively, if the event is not a system event in step 206, the routine of FIG. 4 tests whether the event is a menu event in step 208. If so, the routine of FIG. 4 processes the menu event in step 209 before it loops back to step 205. If the event is not a menu event in step 208, the routine 200 tests whether the event is a form load event in step 210. If so, the new form is loaded in step 211. From step 211, the routine of FIG. 6 loops back to step 205 to process the next event. If the event is not a form load event, the routine 200 of FIG. 6 checks to see if the application handler for the spreadsheet has completed operation in step 212. If a quit event had been generated, the routine 200 provides default processing for the application in step 212 before it exits in step 214. Alternatively, if the application handler has not completed operation in step 212, the routine dispatches the event as necessary in step 213 before the routine 200 loops back to step 205 to process the next event in the spreadsheet handler 200.

Figure 7:
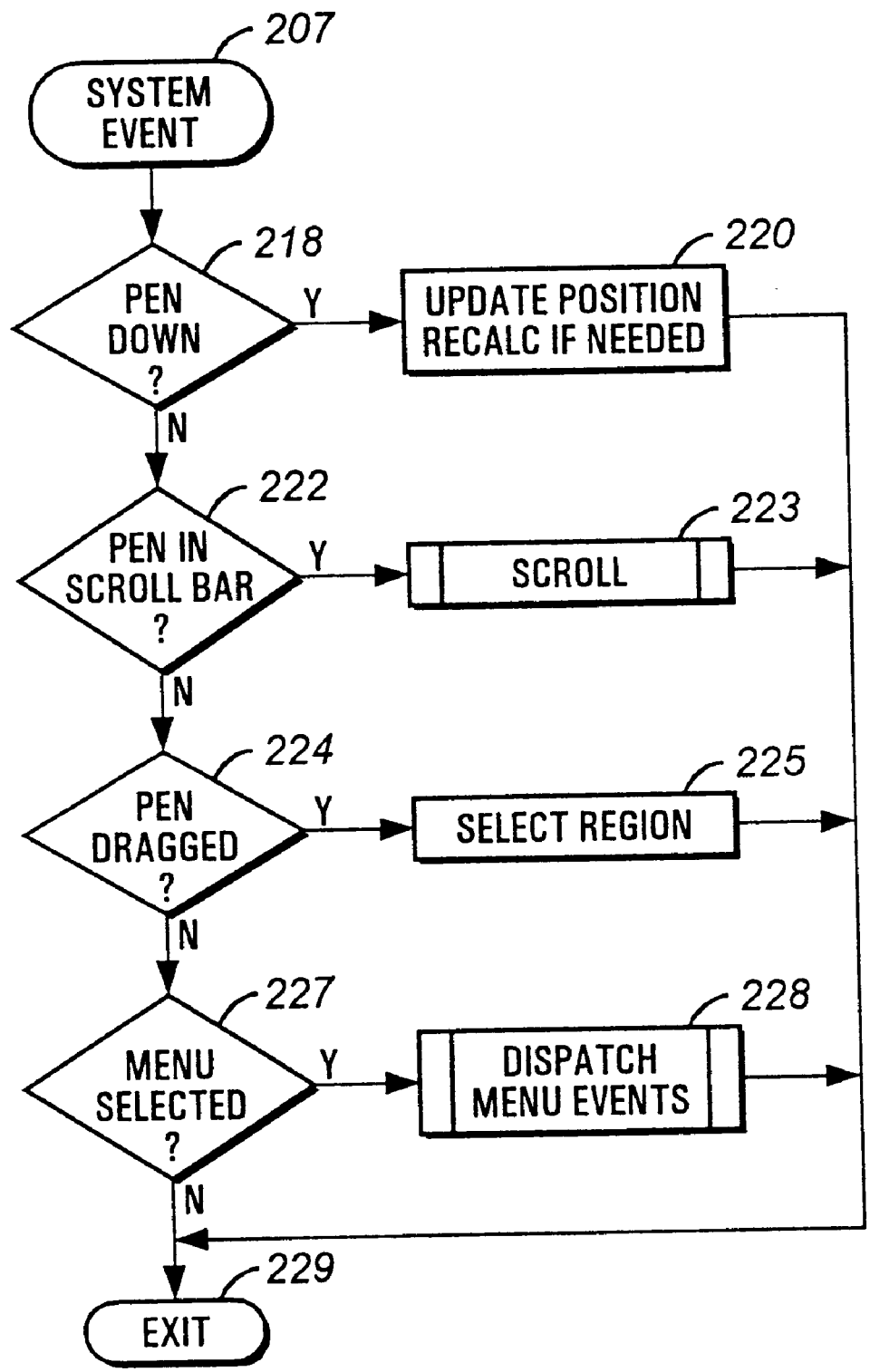
FIG. 7 is a flowchart illustrating the process for handling system events in FIG. 6.

The system event handler 207 of FIG. 6 is shown in more detail in FIG. 7. From step 207, the routine of FIG. 7 checks to see if the user is actuating the pen in step 218. If the pen 33 is pressed down on the LCD screen 35 in step 218, the routine updates the active cell in step 220 and recalculates values of the spreadsheet in step 220. Alternatively, if the pen 33 is not down in step 218, the routine 207 checks if the pen 33 is in a scroll bar region in step 222. If so, the routine 207 performs the scroll operation in step 223 before it exits.

If not, the routine 207 checks if the pen is dragged down in step 224. If so, the user has selected a particular block of cells for purposes such as cutting, pasting, or generating graphs, among others. In such case, the routine 207 highlights and selects the blocked region in step 225 before it exits. Alternatively, if the pen 33 is not dragged in step 224, the cell is being edited in step 226. From step 226, the routine checks if the user has selected menu items in step 227. If so, the menu event is dispatched in step 228 before the routine 207 exits in step 229. From step 227, if no menu events have been generated, the routine 207 exits FIG. 7.

Figure 8:
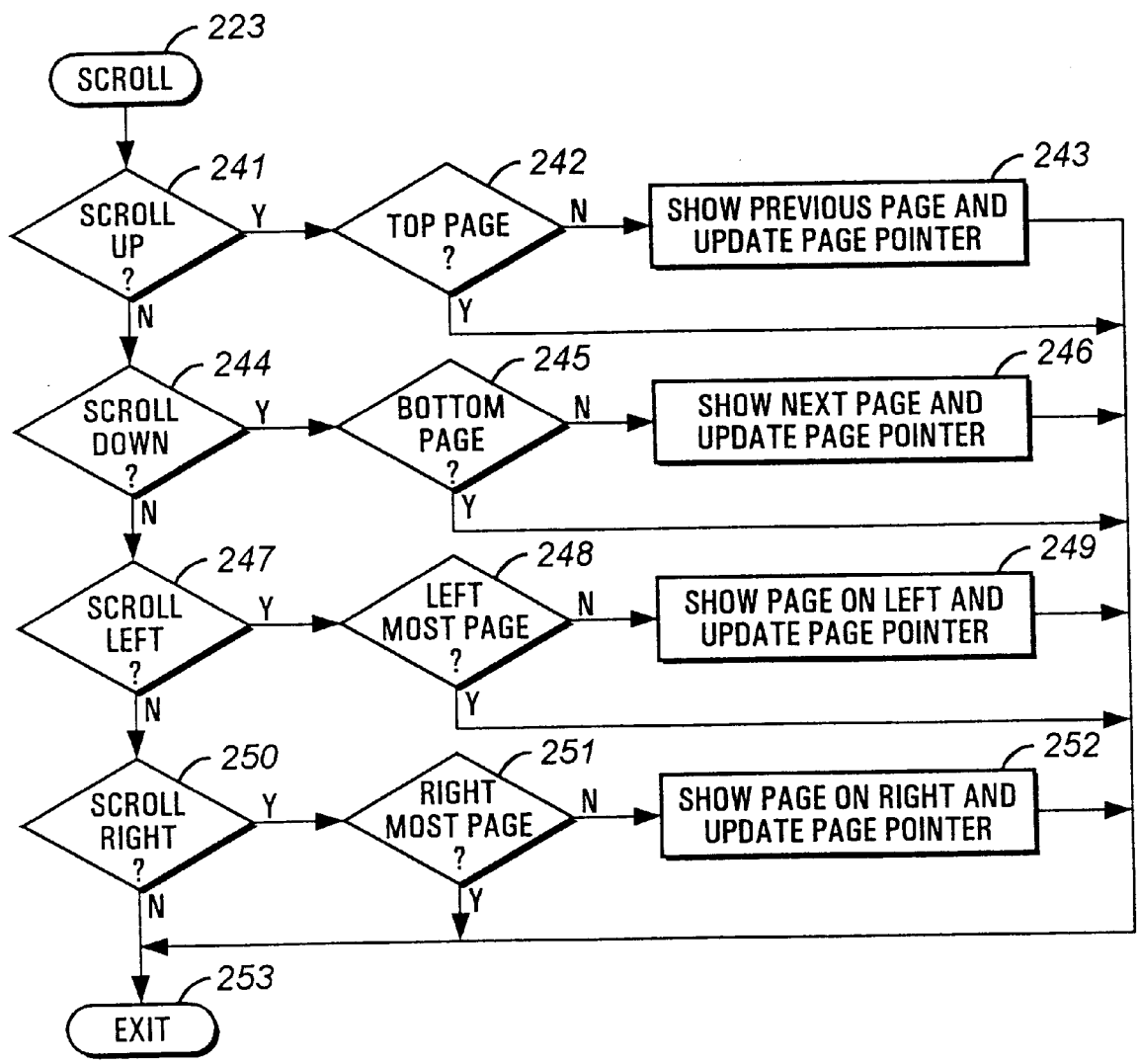
FIG. 8 is a flowchart illustrating in more detail the scroll process of FIG. 7.

Referring now to FIG. 8, the scroll routine 223 of FIG. 7 is shown in more detail. From step 223, the scroll routine checks to see if the user requested a scroll-up operation in step 241. If so, the routine 223 then checks if the spreadsheet is already at the top of the page in step 242. If not, the scroll up operation is performed to show the previous page in step 243. Furthermore, the page pointer is updated in step 243 before the routine 223 is completed in step 253. From step 242, if the spreadsheet is already at the top of the page, the routine 223 is simply exited.

Alternatively, if the scroll operation is not scroll-up in step 241, the routine 223 checks if the user is requesting a scroll down in step 244. If so, the routine 223 further checks if the spreadsheet is at the bottom most page in step 245. If not, the routine 223 exits. Alternatively, if the spreadsheet is not at the bottom most page, the routine 223 shows the next page and updates the page pointer in step 246 before it exits in step 253.

From step 244, if the operation is not scroll-down, the routine 223 checks if the user has requested a scroll left operation in step 247. If so, the routine 223 checks to see if the user is already at the left most page in step 248. If the current spreadsheet page is not the left most page in step 248, the routine 223 proceeds to step 249 where it displays the left page and updates the pointer to point one page to the left. Alternatively, from step 248 if the user is already at the left most page, or from step 249, the routine 223 exits in step 253.

From step 247, in the event that the user is not requesting a scroll left operation, the routine 223 checks if the user has requested a scroll right operation in step 250. If so, the routine checks if the current page is the right most page in step 251. If not, the routine 223 transitions from step 251 to step 252 where it shows the page on the right of the current page and updates the page pointer appropriately. From step 252, or from step 251 in the event that the user is already at the right most page, or from step 250 where the user did not request a scroll right operation, the routine 223 exits in step 253.

Although not shown, the present invention contemplates that scroll panels are supported. Scroll panels are used to lock the display of the spreadsheet in particular horizontal and/or vertical directions. For instance, scroll panels are useful for constantly displaying period information such as the months on the spreadsheet, regardless of the user's scrolls. In such a case, the routine 223 of FIG. 8 checks if the user has specified a row and a column relating to scroll panels. If the user has specified that particular row and/or column be the scroll panels, the routine locks the row and/or column such that the locked row/column defines the top and left most pages of step 242 and 248. Once locked, the locked row and/or column are always displayed relative to other rows and columns.

Figure 9:
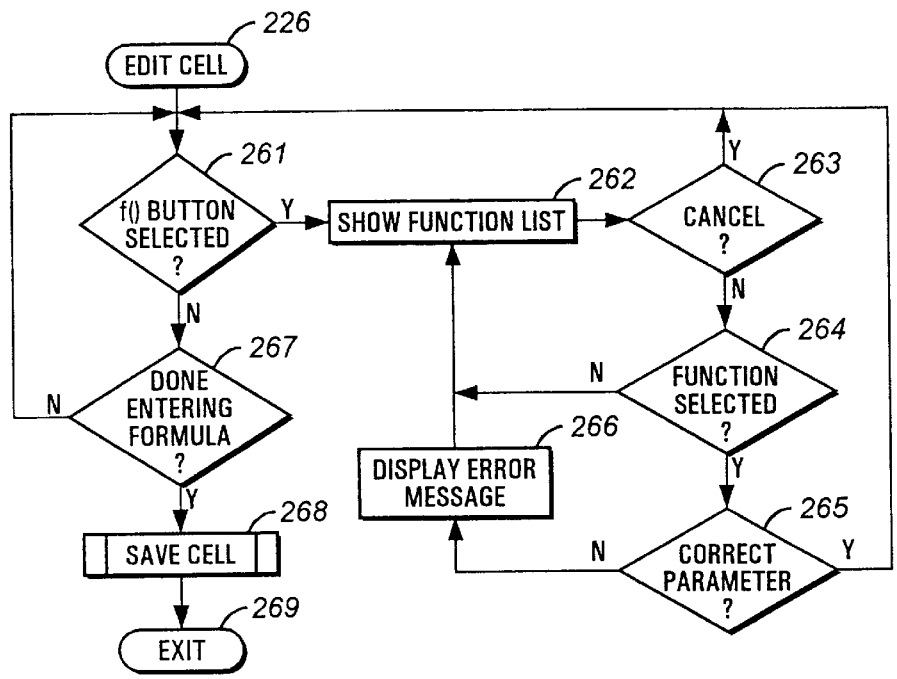
FIG. 9 is a flowchart illustrating the process for editing cell contents of FIG. 7.

Referring now to FIG. 9, the edit cell step 226 of FIG. 7 is shown in more detail. From step 226, the routine examines if the function button has been selected in step 261. If so, the routine 226 proceeds to step 262 where it displays a function list before it proceeds to step 263. In step 263, the routine 226 checks if the cancel button has been pressed. If so, the routine loops backs to step 261. If not, the routine 226 checks if the user has selected a function from the displayed list in step 264. If not, the routine 226 loops back to step 262 where it awaits an action from the user. Alternatively, if the user selected a function in step 264, the routine 226 checks if the user has provided the correct parameter in step 265. If the parameters are incorrect, the routine displays error messages in step 266 before it loops back to step 262. On the other hand, if the correct parameters are provided, the routine 226 loops from step 265 back to step 261 to continue processing the cell edit operation.

Alternatively, from step 261, if the function button has not been selected, the routine 226 checks to see if the user has completed entering the formula in step 267. If not, the routine loops from step 267 back to step 261 to continue processing user requests. Alternatively, if the user has completed entering the formula into the cell in step 267, the routine 226 transitions from step 267 to step 268 where it saves the cell contents. Upon completing step 268, the routine 226 of FIG. 9 exits in step 269.

Thus, in the present invention, when the pen 33 is double-clicked on a particular spreadsheet cell, a cell edit window is brought up. The cell edit window shows on the left hand the row, column index. Further, the content of the cell, which is editable, is displayed. Additionally, an enter (done) button, a functions button, and a cancel button is provided. The enter or done button is used to indicate that the user has completed his or her editing operations and that the user wishes to accept the changes and go back to the display of the rest of the spreadsheet. The functions button, when actuated, shows a scrollable list of the functions supported by the spreadsheet system. The functions button further awaits for selection of one of the functions displayed. spreadsheet to support number intensive data analysis. When a function has been selected, the function is entered into the space and may be edited if necessary. Finally, the cancel button allows the user to terminate his or her cell editing function and return back to the spreadsheet without affecting anything.

Figure 10:
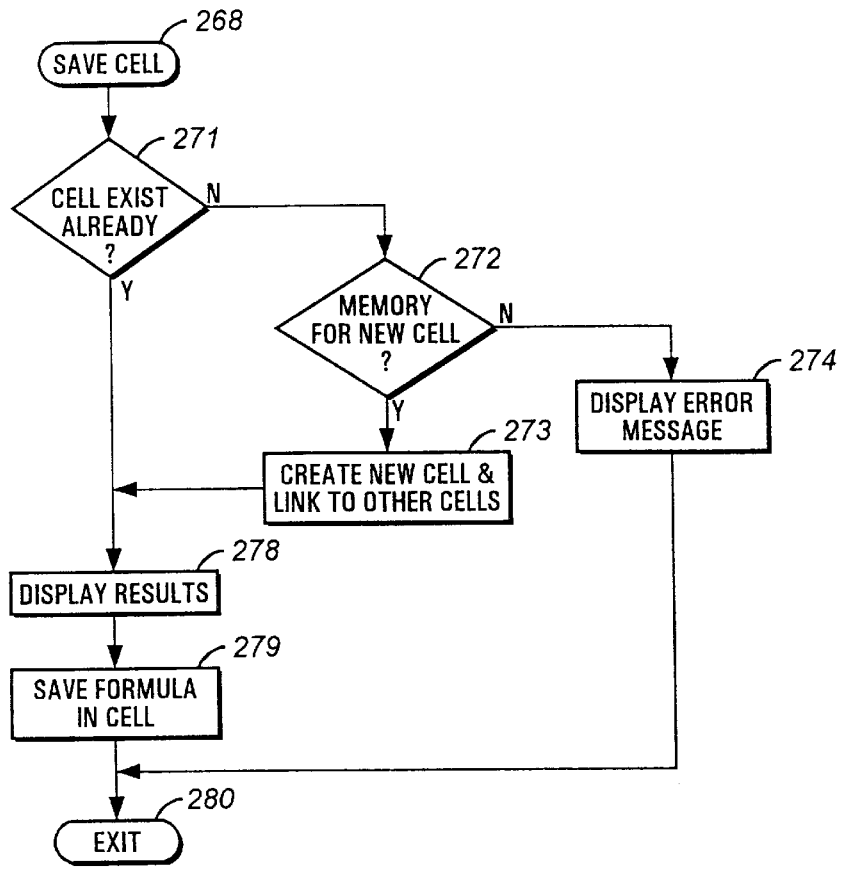
FIG. 10 is a flowchart illustrating the process to save a cell in FIG. 9.

Turning now to FIG. 10, more detail on the save cell step 268 is shown. From step 268, the routine of FIG. 10 first checks to see if the current cell exists already in step 271. If no, the routine transitions to step 272 where it checks if sufficient memory exists for the new cell. If the remaining memory is insufficient, the routine 268 transitions from step 272 to step 274 where it displays one or more error messages before transferring to step 280. Alternatively, from step 273, in the event that sufficient memory exists to support another spreadsheet cell, the routine 268 creates a new cell and link the new cells to prior cells.

From step 271, if the cell exists already, or from step 273 where the new cell had been created and if the result of the formula evaluation is successful, the routine 268 displays the result in step 278 and saves the formula in the current cell in step 279 before the routine 268 exits in step 280. Alternatively, if the result of the formula evaluation in step 276 is not successful, the routine 268 transitions from step 277 to step 274 where it displays an error message before it moves to step 279 to save the formula, even if the formula has an error of some type such that the user can subsequently edit the formula. From step 279, the routine 268 exits in step 280.

Figure 11:
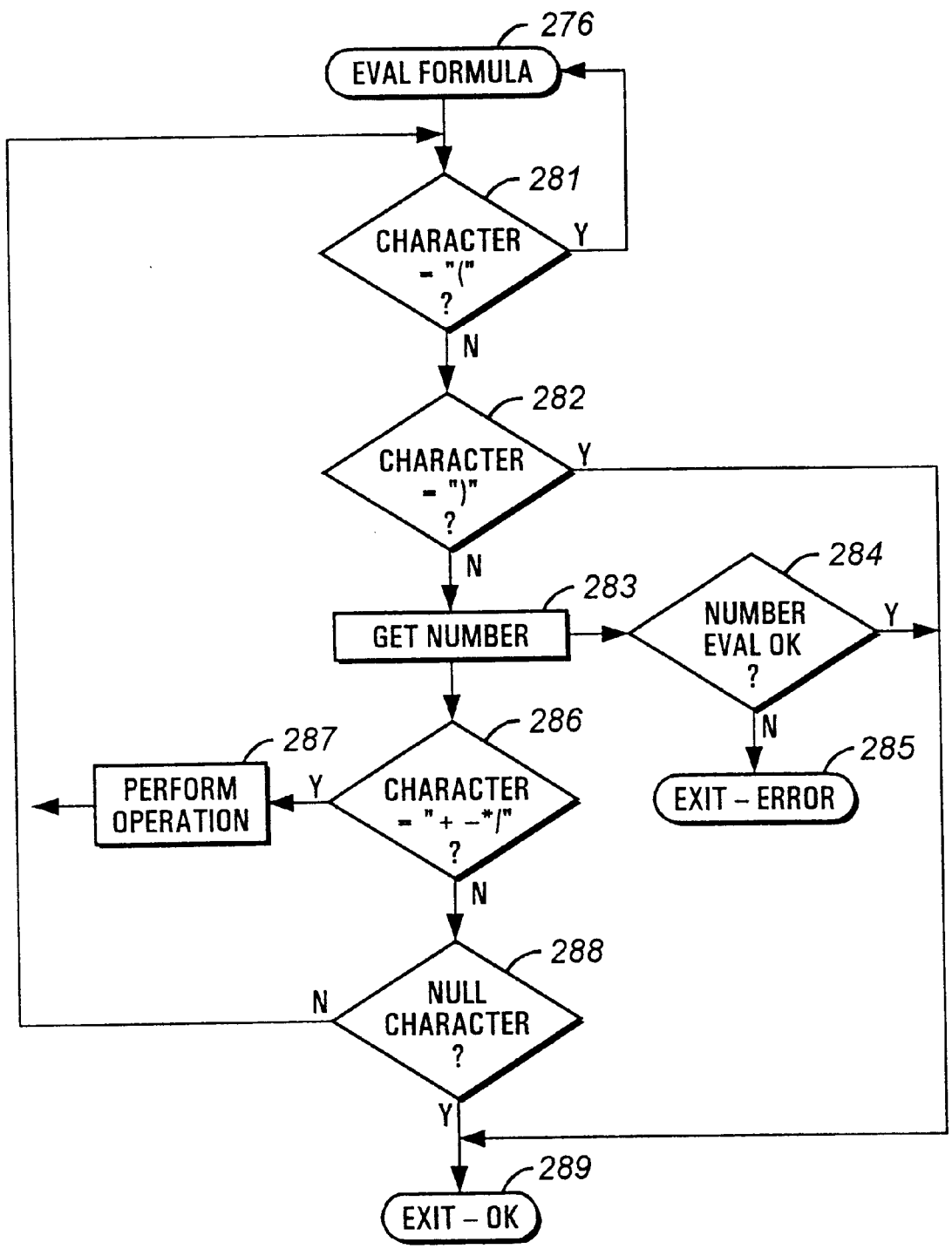
FIG. 11 is a flowchart illustrating the process for evaluating a formula of FIG. 10.

Referring now to FIG. 11, a formula evaluation routine is discussed in more detail. This routine is executed by a pen down event handler to process the data input. In FIG. 11, the routine 276 first checks if the current character in the string under evaluation is an "(" in step 281. If so, the routine recursively calls itself in step 276 to resolve the value of the string enclosed within the "()" pair. This method is known in the art as "substringing." From step 281, the routine 276 next checks if the character is a ")" in step 282. If so, the routine returns to its caller in step 289. Alternatively, in the event that the character is not a ")", the routine gets the next string which could be a number or an arithmetic operator in step 283. From step 283, in the event that the number evaluator fails to reduce the string to a number in step 284, the routine exits with an error indication in step 285. Alternatively, if the number evaluated in step 284 results in a valid number, the routine exits in step 289 without an error indication.

From step 283, in the event that the character is an arithmetic operator such as +, −, / or * in step 286, the routine 276 performs the operation in step 287 before it loops back to step 281 to continue the string processing. Alternatively, in the event that the character is not an arithmetic operator, the routine 276 next checks if the character is a NULL character in step 288. If so, the routine 276 transitions to step 289 where it returns with an OK indication. Alternatively, if the character in step 288 is not a NULL character, the routine loops back to step 281 to continue processing the string in the formula entered.

Turning now to FIG. 12, the routine to process menu events of FIG. 6 is shown in more detail. From step 209, the routine checks if the user has selected the "File" menu event in step 291. If so, the routine 209 transitions to step 292 where selections in the file menu event are processed. These selections include, among others: open, close, save, save as, and quit. Upon completion of the file menu items in step 292, the routine 209 exits in step 299.

From step 291, in the event that the file menu item is not selected, the routine 209 transitions to step 293 where it checks if the user selected an edit menu. If so, the routine 209 transitions to step 294 to handle the edit menu items The edit menu items include: undo, redo, cut, copy, paste, find, replace, goto, insert, delete, format, and width changes, among others. Upon completion of the edit menu items in step 294, the routine 209 exits in step 299.

From step 293, if the edit menu item is not selected, the routine checks in step 295 whether a graph menu has been selected. If so, the routine 209 transitions to step 296 where the graph requests are handled. The graph operations performed in step 296 include a selection of the graph type (pie, line, bar, area, hi-lo, and scatter) and a layout control (series, axis, grid/tick, title, legend, and label). . Upon completion of the graph menu items in step 296, the routine 209 exits in step 299.

Alternatively, from step 295, if the graph menu item is not selected, the routine 209 checks if the view menu item is selected in step 297. If not, the routine 209 simply exits in step 299. Alternatively, if the view option has been selected, the routine 209 transitions to step 298 to perform zoom operations. The zoom operation is important in a palmtop computer as the display 35 is relatively small and can display in full only small sketches. To resolve this issue, the routine of FIG. 13 causes the display 35 to select a particular magnification factor such as 150%, 75%, 100%, 150%, 200% and a user selectable scale. Upon receipt of the magnification factor, step 298 centers in on the cell last edited and enlarges or shrinks the spreadsheet display as requested. When the user is done viewing the scaled display, the user can click on a button such as an OK button or a GoBack button to move back to the spreadsheet functionality.

The present invention also contemplates a second embodiment where, underneath the menu is an outline which fences in a spreadsheet area where the user can enter information or manipulate the spreadsheet. Further, upon selecting the magnifier option from the View menu, a magnifier is displayed whenever the pen input device 33 touches the LCD screen 35 of the computer system. Additionally, a zoomed drawing area is displayed along with the movement of the pen input device and the magnifier. When the user successively and quickly depresses (double clicks) the pen 33 twice when the pen is in the magnifier mode, the sketching system enters into a zoomed viewing mode, as further described below.

Upon depressing twice (double clicking) the pen when it is in the magnifier view mode, the zoomed drawing area is enlarged into an enlarged zoomed drawing area which occupies the space formerly belonging to the drawing area. The enlarged area provides the user with a enlarged, more comfortable view of the object(s) such as the spreadsheet cell(s) or database records being edited. To provide the user with a perspective of the particular portion of the drawing which he or she is working on, a miniaturized illustration of the entire drawing is shown as a floating insert or a draggable window which is shown at the top left corner of the enlarged zoomed drawing area. The floating insert or draggable window showing the miniaturized illustration may be freely moved within the enlarged zoomed area. The miniaturized illustration thus provides a bird's eye view of the entire drawing and further shows an outline of the zoomed drawing area or the enlarged zoomed drawing area. The outline may be moved to scroll around the drawing. When the outline is moved, the display region is also updated to reflect the objects located at the current position of the outline.

The outline also has four sides which can be adjusted to adjust the zoom ratio of the objects shown on the enlarged zoomed drawing area. Thus, by adjusting the dimension of the outline, the user can vary the enlargement view on the area. Thus, the magnifier and the miniaturized illustration balances between the need for showing the entire drawing with the limited display region afforded by the portable computing appliance. Upon completion of the zoomed viewing sequence, the user can select the full drawing view option from the Edit menu to display the entire drawing on the screen.

Referring now to FIG. 13, the process for handling zoom requests in the view menu 297 of FIG. 12 is shown in more detail. In FIG. 13, the routine 298 obtains a zoom range in step 311. Next, in step 312, the routine 298 computes the zoom ratio based on the zoom range, or alternatively, from a zoom ratio input from the user which may range from 150% to 200% to a user selectable ratio. In step 313, the routine 298 performs a rasterization based on the zoom ratio and the display window. Next, in step 314, the routine 298 puts up the rasterized bit map on the display 30, along with a Goback or Done button. In step 315, the routine waits for the user to select the Goback button. Once the user has indicated that he or she has completed viewing the zoomed image, the routine 298 exits via step 316.

The present invention also contemplates that, in a second embodiment, a magnifier icon is displayed whenever the pen 33 touches the LCD screen 35 of the computer system. Further, an outline box is displayed around the magnifier icon to indicate the viewing area available when the magnifier zooms. Thus, when activated, the routine displays an enlarged view of the drawing at the point where the pen 33 touches the screen 35 of the computer system, much like a conventional magnifier would. In this embodiment, the routine 298 also displays a Bird's Eye (BE) view of the entire drawing in a BE window. Further, a zoom box is displayed inside the BE window to indicate to the user his or her relative position on the drawing. The zoom box has four sides which are selectable by the pen to adjust the zoom scale, as discussed below. The second embodiment of the routine 298 checks for a pen event occurring within the BE window. If not, the pen event belongs to the primary window and representing either a draw or edit event. Thus, if the pen is not in the BE window, the routine calls the cell edit routine (FIG. 9). In the event that the pen is in the BE window, the routine checks for adjustments to the zoom box to change the scaling factor of the main display window. In the event that the zoom box has been adjusted by clicking on the zoom box and adjusting either the horizontal lengths or the vertical lengths, the routine computes the zoom ratio based on the zoom box adjustment. Preferably, the zoom ratio is computed as a function of the ratio of the length of the zoom box to the length of the BE window and further as a function of the ratio of the width of the zoom box to the width of the BE window. The alternate routine then applies the newly computed zoom ratio and refreshes the main display by performing the appropriate enlargement or shrinkage on the objects encompassed within the newly adjusted zoom box. Furthermore, if the zoom box has been dragged to a new viewing location, the routine receives the new coordinates of the zoom box relative to the BE window and updates the content and location of the zoom box in the BE window.

Turning to FIG. 14, the routine to update the cells of the spreadsheet of the present invention is illustrated. In FIG. 12, from step 204, the routine determines the rows and columns that need to be updated in step 321 which is discussed in more detail in FIG. 15. Next, the routine 204 checks to see if the cells had been updated earlier during the day in step 322. If so, there is no need to perform the update and the routine 204 exits in step 330.

Alternatively, if the cells had not been updated in the day, certain cells need to be updated. In that case, the routine proceeds from step 322 to step 323 where it creates a query designed to obtain the proper information. Next, in step 324, the routine connects to the server over the Internet or a suitable media. In step 325, after establishing the connection, the routine submits the query. The routine 204 passes the query created in step 323 to the server in a query string which contains the name of a Common Gateway Interface (CGI) script. The CGI script sends the search to a database located on the server, receives the result of the query, along with the HTML page created by the database to contain the result, and passes it back to the server to be sent back to the routine 204.

Next, in step 326, the routine 204 waits until the reply is complete. If so, the routine parses the reply into formatted data in step 327 and in step 328 stores the new data in the cells determined in step 321. Step 328 also copies the formulas from related cells into adjacent cells and recalculates the spreadsheet. The formulas from the related cells represent mathematical relationships to the new information. For instance, in an income statement, the gross profit is determined by obtaining new data on sales and cost of goods and subtracting the cost of goods from the sales information. From step 328, the routine 204 refreshes the Last_Updated flag to reflect the most recent time that the spreadsheet had been updated to prevent needless updating. From step 329, the routine 204 exits in step 330.

Turning now to FIG. 15, the process to identify the rows and columns to be updated is disclosed in more detail. From step 321, the routine prompts the user to click on a row or column identifier. Next, in step 340, the routine checks to see if a label exists for the selected row or column. The label is important as the query of step 323 will be based on the label information. If the label does not exist, the routine 321 prompts the user for a label in step 341. From steps 340 or 341, the routine 321 checks if the label has an alias. The use of an alias allows the label to be more descriptive while satisfying specific naming constraints on the remote database. If the alias exists for the label, the routine 343 applies the alias to the label. From steps 343 or 343, the routine 321 checks if all rows and columns to be updated have been identified. If not, the routine 321 loops back to step 340 to obtain information on the next row or column to be updated. Alternatively, if all rows and columns to be updated have been identified, the routine 321 exits in step 345.

Although cell updates to and from the Internet 150 have been discussed so far, the present invention also contemplates supporting the updates of specific objects such as an Object Linking and Embedding (OLE) container to enable the Windows program to cut, copy, paste entire objects, such as charts, spreadsheets or word processing documents, directly between applications. Such sharing of OLE container classes is discussed in Chapter 14 of Gregory et al., *Building Internet Applications with Visual C++* (1996), hereby incorporated by reference.

Figure 16:
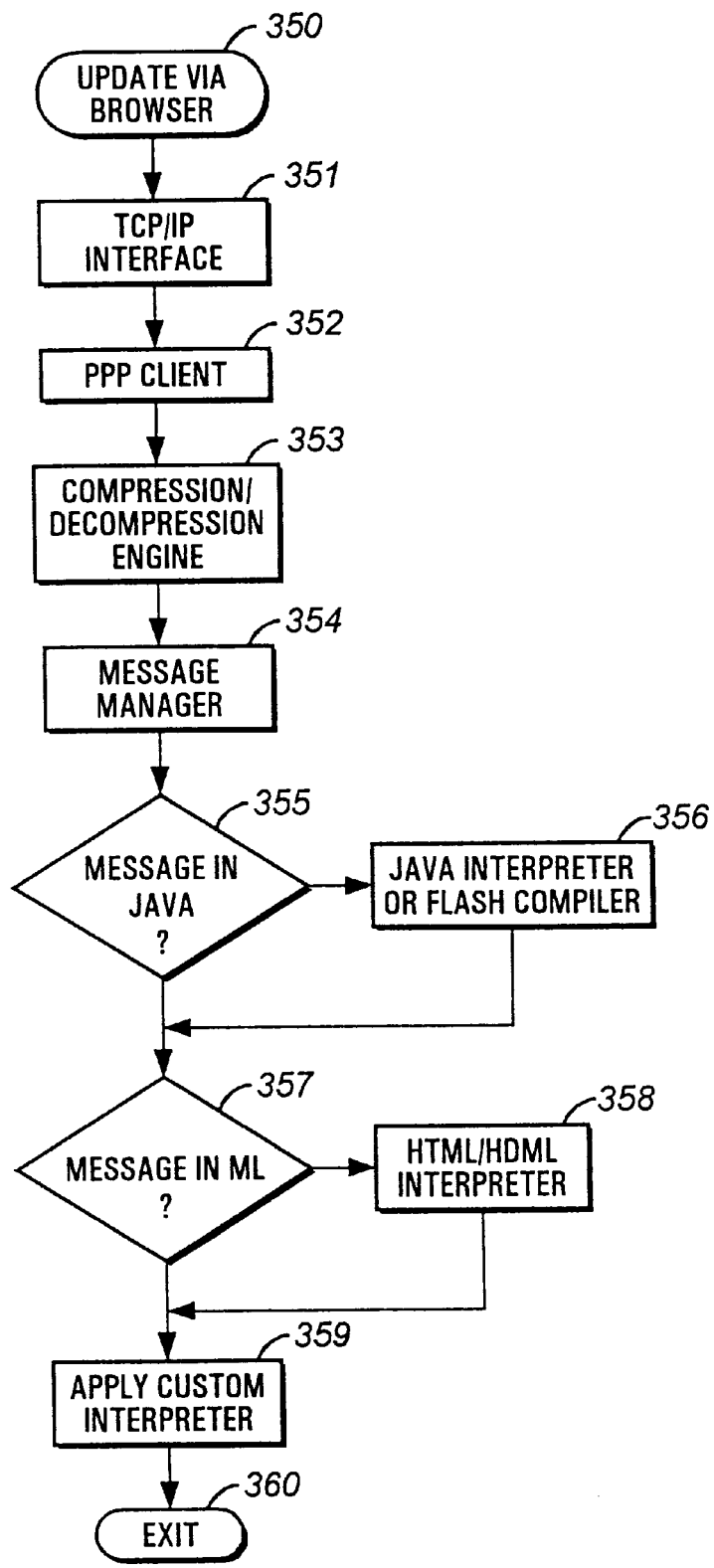
FIG. 16 is a flowchart illustrating the process for retrieving data over a network such as the Internet using a browser.

Turning now to FIG. 16, another method to update the spreadsheet is shown. In FIG. 16, the user can activate a browser to view information on the Internet or other suitable network and designate the information to be retrieved into the spreadsheet. In this process, the routine executes a TCP/IP layer module in step 351. The PPP client layer 352 is then invoked. The data from the PPP client layer 352 is provided to a compression/decompression engine 353. Next, the decompressed data is provided to a message manager in step 354. If the message is a Java based message in step 35, the routine 350 provides the message to a Java interpreter, a just-in-time Java compiler, or a Java flash compiler in step 356.

From steps 355 or 356, the routine then checks the remaining messages to see if it is in a Mark-up Language in step 357. If so, the routine 350 provides the message to a HTML or a HDML interpreter in step 358. From steps 357 or 358, if the incoming message is provided to a default custom interpreter in step 359 to handle special protocols supported by the user's application. From step 360, the browser routine 350 exits in step 360. Thus, by using the browser of FIG. 16, the user can view the contents of databases located on the Internet and download the data via an appropriate protocol such as file transfer protocol (FTP). The incoming packet is executed if it is in Java, interpreted if it is HTML/HDML or custom protocol, and ultimately provided to the spreadsheet of the present invention.

Figure 16A:
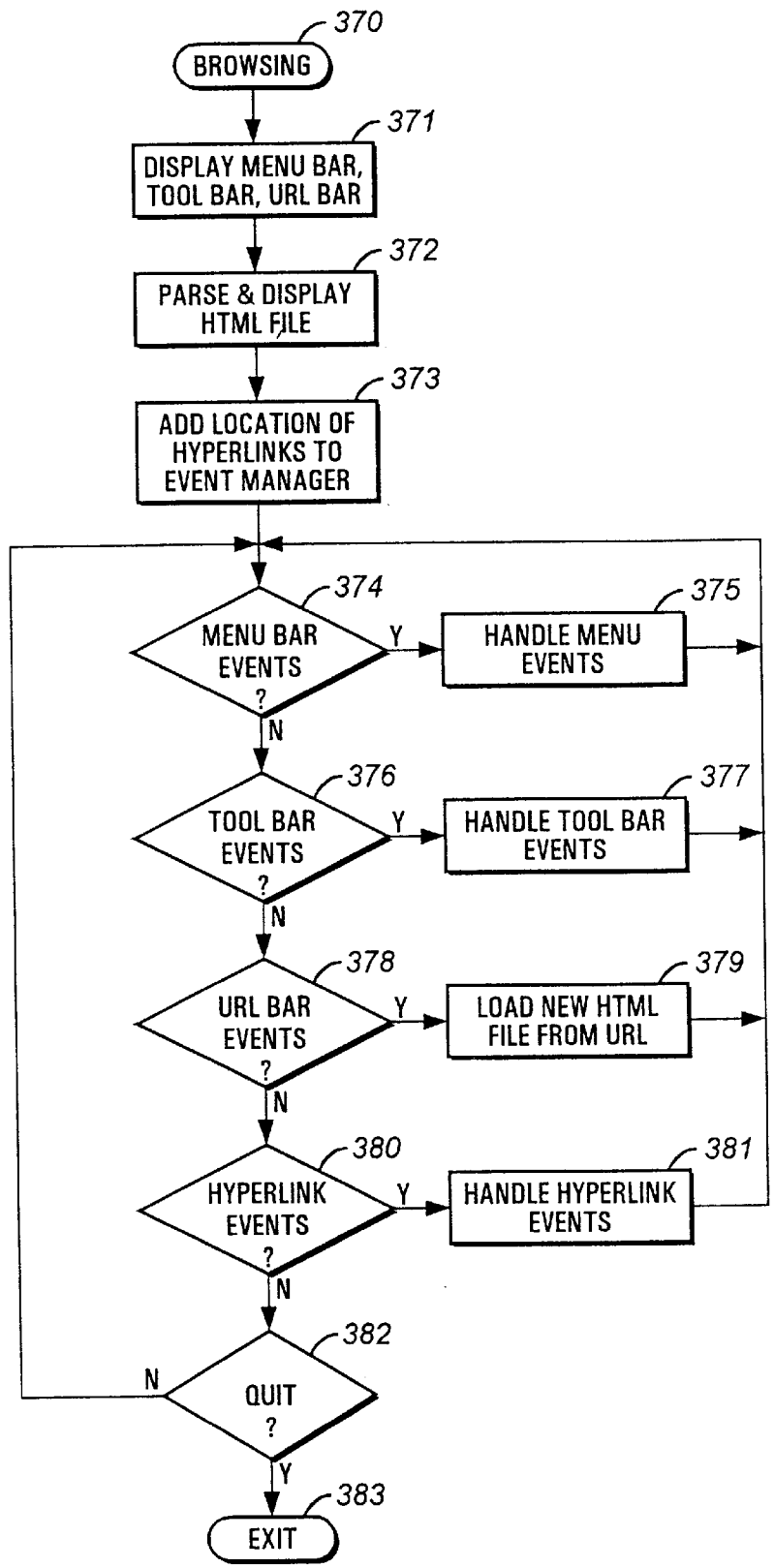
FIG. 16A is a flowchart illustrating the process for executing the browser of the present invention.

In addition to the Java and HTML/HDML interpreter framework, the browser of the present invention preferably supplies a user interface with a menu bar, a tool bar, a URL bar in addition to the active window displaying the Web page. Turning now to FIG. 16A, the operation of the browser of the present invention is disclosed in more detail. From step 370, the routine displays a menu bar, a tool bar and a URL bar in step 371. The toolbar preferably allows the user to move backward/forward through various Web pages, reload a page, travel to a home page, print a page, stop the current load, among others. Furthermore, on the URL bar, an icon is available that, if dragged onto the window of the portable computer's desktop, creates a double-clickable link to that site on the desktop. Additionally, when entering data on the URL, the traditional "http:/t/www" or "ftp://" can be automatically supplied by the browser. At the bottom of the active window displaying the Web page, the browser preferably displays a key which indicates the page's built-in security feature. Further, a status line is supplied to indicate the completion rate of the page download. Preferably, to conserve display area associated with the small LCD display 35, the tool bar and the status line are made to be hideable.

From step 371, the routine accepts the user's URL, retrieves the HTML file from that URL, and parses the HTML file in step 372. Next, the routine of FIG. 16A adds the locations of the hyperlinks, as indicated in the respective HTML tags, into the event manager for watching. Once the hyperlink locations have been entered, the event manager catches double clickings on the hyperlinks and appropriately processes the requests for the hyperlinks.

From step 373, the routine checks for occurrences of menu bar events in step 374. If so, the routine jumps to the menu event handler in step 375. Alternatively, if no menu bar event occurred, the routine proceeds from step 374 to step 376 to check for tool bar events. If tool bar items have been selected, the routine proceeds from step 376 to step 377 where it handles tool bar events. Alternatively, if no tool bar events occurred in step 376, the routine proceeds to step 378 to check if the user has specified a new URL location. If so, the routine loads the new HTML file from the new URL location, parses the new HTML file, and adds the locations of the hyperlinks in the new HTML file in step 379. Alternatively, in the event that no hyperlink events occurred, the routine checks if the user wants to exit the browser in step 382. If so, the routine exits the browser in step 383. Alternatively, from step 382, or from steps 375, 377, 379, or 381, the routine of FIG. 16A loops back to step 374 to continue processing events in the browser. Although not shown, the browser routine 370 has a cache which improves access performance. Two types of cache are provided: a memory cache and a file cache. The memory cache buffers short term storage of graphic objects whereas the file cache is for intermediate term storage of data objects, as known to those skilled in the art.

The browser of the present invention also provides an off-line browsing capability to compensate for long delays associated with Web traffic. In the off-line mode, the computer of the present invention instructs a host server to perform searches during off-peak time and save the search result for subsequent viewing at a much faster pace. In this manner, the Web experience is preserved without the frustrating delays typically encountered when accessing the Web at peak hours. Preferably, the browser of the present invention has an integrated front end to Web search engines and directory, allowing users to issue a query using multiple search engines such as Lycos and Yahoo. As the front end generates direct inquiry to the CGI compatible databases, the front-end is relatively compact. To prevent the search engines from presenting the user with a large number of useless results, a data filter is provided to reduce the amount of documents to be viewed. The browser can be configured to download specific objects, such as text only such that large graphics files can be discarded if the user does not want to view graphics. Furthermore, the browser deploys agents to monitor the Bookmark mentioned above and rerun the search at specified intervals and notify the user when new results are found. Preferably, even in the off-line browsing mode, the browser of the present invention replicate the Web experience by preserving the URL. In one embodiment, the browser of the invention supports a news ticker capability which automatically download news files at night according to a user defmed schedule. The news ticker is subsequently presented to the user when the computer is idle in an analogous manner to a screen saver.

Figure 17:
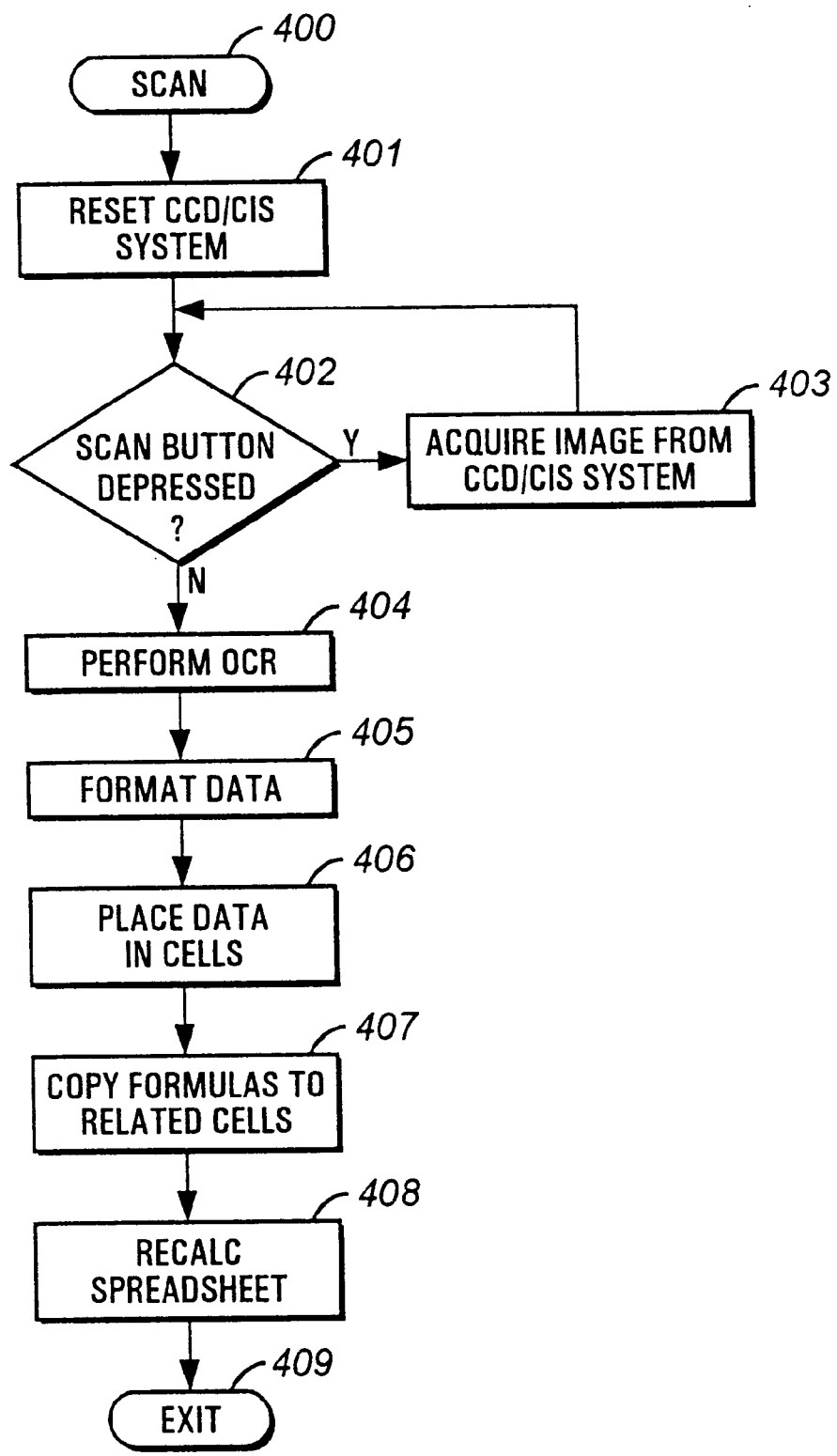
FIG. 17 is flow chart of the process for scanning information using the scanner of FIG. 2A and updating the data management system of FIG. 1.

Turning now to FIG. 17, the routine for receiving images via the CCD/CIS unit 27 is shown in more detail. From the scan step 400, the routine issues a reset instruction to the CCD/CIS unit 27 in step 401. Next, the routine 400 checks if the scan button on the CCD/CIS unit 27 is depressed. If so, the routine 400 acquires the image from the CCD/CIS system 27 in step 403 and loops back to step 402 to continue the image acquisition until the scan button is released in step 402. Once the scan button is released in step 402, the routine 400 performs an optical character recognition (OCR) process in step 404. The optical character recognition may perform a combination of feature detection and template matching methods for recognition of characters, as disclosed in U.S. Pat. No. 5,436,983, or may utilize neural networks as is known in the art.

From step 404, the routine 400 formats the OCR data in step 405. Next, the routine 400 places the formatted data in the cells of the spreadsheet in step 406. From step 406, the routine 400 also copies related formulas to appropriate cells in the spreadsheet. As an example, in the event that the routine 400 had scanned, OCRed, and converted sales and cost of goods figures in to the spreadsheet, step 407 may copy the formula for computing gross profit below the cost of goods line if the gross profit formula is used for current sales figures. Next, in step 408, the routine performs a spreadsheet recalculation before it exits in step 409. In this manner, the computer and scanner may be used to optimize the data acquisition process.

Figure 18:
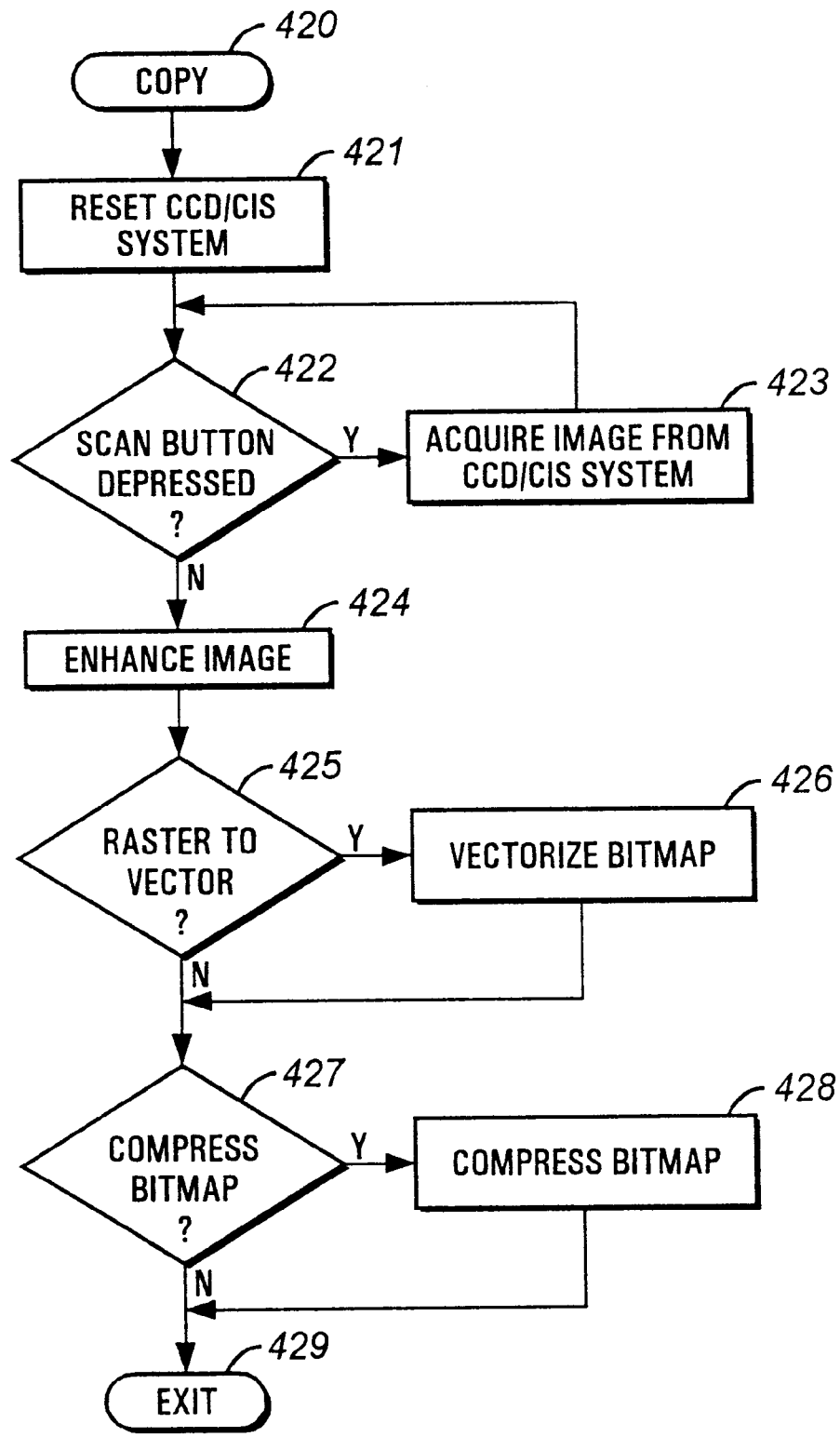
FIG. 18 is flow chart of the process for copying information using the scanner of FIG. 2A and storing or transmitting the data using the computer system of FIG. 1.

Turning now to FIG. 18, the corresponding process for copying images using the CCD/CIS unit 27 is disclosed. From the copy step 420, the routine issues a reset instruction to the CCD/CIS unit 27 in step 421. Next, the routine 420 checks if the scan button on the CCD/CIS unit 26 is depressed. If so, the routine 420 acquires the image from the CCD/CIS system 27 in step 423 and loops back to step 422 to continue the image acquisition until the scan button is released in step 422. Once the scan button is released in step 422, the routine 420 performs an optional image enhancement step 424 using known image signal processing routines. Next, the routine 420 proceeds to step 425 where, if the raster to vector option is picked, the bitmap is vectorized in step 426 before the routine 420 continues. From steps 425 or 426, the routine 420 proceeds to step 427 where it checks if the compression option has been selected. If the compression option has been selected in step 427, the routine performs the bitmap compression process in step 428. From steps 427 or 428, the routine 420 exits. Thus, in the manner discussed, the computer of the present invention allows the user to scan in images on the fly, digitally enhance the images, and store the images for subsequent printing in the event that the user simply wishes to copy the images, or include the images in a document or a file to be transmitted via a suitable network, or send the images via facsimile or other medium in the event that the user wishes to fax the image to a remote site for review.

Figure 19:
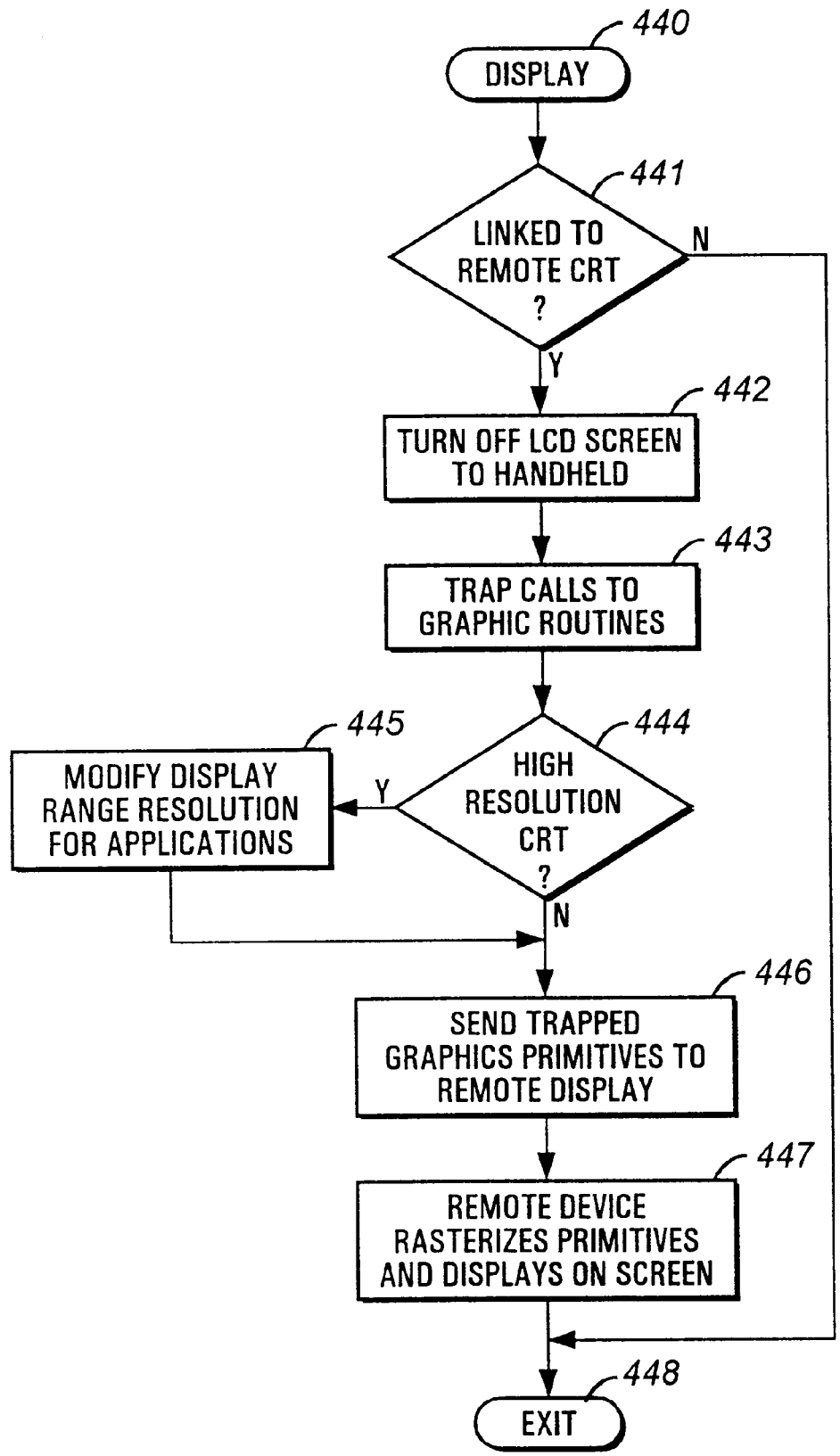
FIG. 19 is a flow chart of the process for linking and transmitting display information from the computer system of FIG. 1 to a larger display device for ease of reading.

Turning now to FIG. 19, the process for viewing data normally shown on the LCD display 35 on the larger remote display device 52 is detailed. In FIG. 19, from step 440, the routine of FIG. 19 checks if a link with the remote display or CRT device 52 is active in step 441. If not, the routine of FIG. 19 simply exits. Alternatively, if an active link to the remote display device 52 exists, the routine of FIG. 19 proceeds to step 442 where it turns off the LCD screen 35 on the portable computer 10. Next, the routine trap graphic calls in step 443 so that a custom version of the graphic routines supporting a higher resolution display are used in place of the original graphic routines supporting the LCD display 35. In step 444, the routine examines the identification data sent by the remote display 52 to determine whether the display 52 is a high resolution device or not. If so, the routine modifies the display range resolution in the graphic routines to support the higher resolution in step 445. Alternatively, if the remote display device 52 is a conventional low resolution TV, the display resolution information is not updated such that the display on the remote low resolution display 52 shows the same information as on the LCD display 35, but merely with enlarged and brighter images for ease of reading. From step 445, or in the event that the display 52 is a conventional low resolution TV in step 444, the routine of FIG. 19 sends the trapped graphics primitives to the remote display 52 in step 446. Next, in step 447, the routine of FIG. 19 receives the high level graphics primitives sent in step 446 and decodes or rasterizes the primitives before displaying them on the remote display 52. When the remote link is ended, the routine of FIG. 19 exits in step 448.

Figure 20:
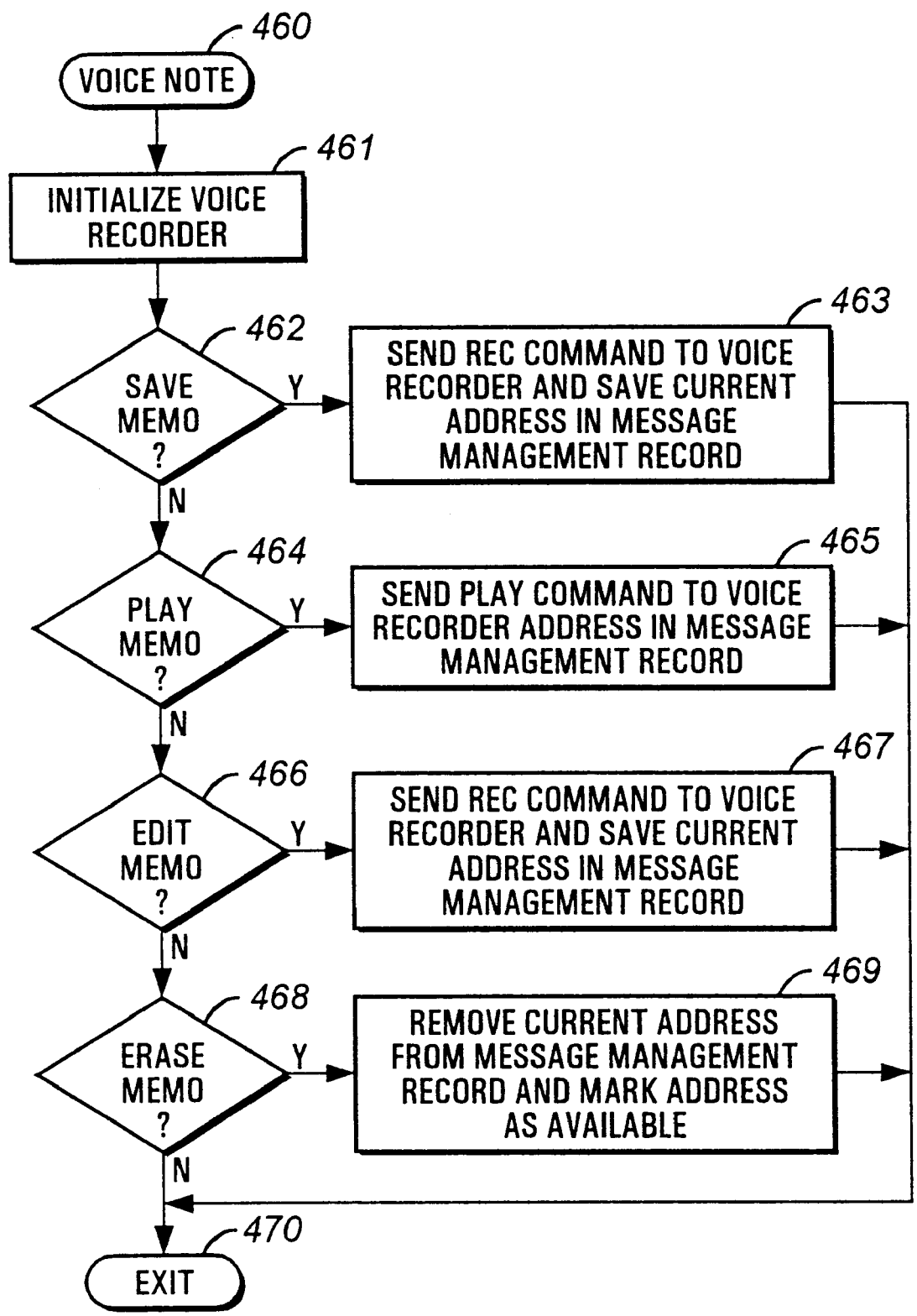
FIG. 20 is a flowchart illustrating the process for capturing voice annotation using a voice recorder shown in FIG. 1.

Turning now to FIG. 20, the routine to record a voice note using the voice recorder 43 is shown in more detail. After entering the routine of FIG. 20 in step 460, the routine initializes the voice recorder 43 in step 461. Next, the routine of FIG. 20 checks for the desired action in step 462. In the event that the user wishes to save a memo in an application, the routine sends a record (REC) command to the voice recorder 43 and saves the current address of the memo in a message management record (MMR) in step 463. The index to the message management record is also saved by the application such that when the user wishes to replay the previously recorded note, the address can be retrieved from the MMR to send to the voice recorder 43 to play. From step 463, the routine exits in step 470.

From step 462, if the application does not need to save a memo, the routine of FIG. 20 checks if the user wishes to play a previously recorded memo in step 464. If so, the routine sends a PLAY command to the voice recorder 43 in step 465 using the address retrieved from the MMR. From step 465, the routine exits in step 470. Alternatively, from step 464, if the user does not wish to play a memo, the routine checks if the user wishes to edit the memo in step 466. If so, the new message is recorded in part or in whole over the old memo in step 467 before the routine of FIG. 20 exits in step 470. Additionally, in the event that the application or the user decides to erase a previously recorded memo in step 468, the routine proceeds to step 469 where it removes the current address from the MMR and mark the space as being available for additional messages. In this manner, the routine of FIG. 20 allows the user to quickly record and edit his or her messages in the voice recorder 43 without consuming main memory 22, as voice messages can be rather memory intensive. Furthermore, as the voice recorder 43 is detachable from the computer 10, the user can carry only the voice recorder in the event the user needs a reminder/recorder device when available space is very small.

Figure 21:
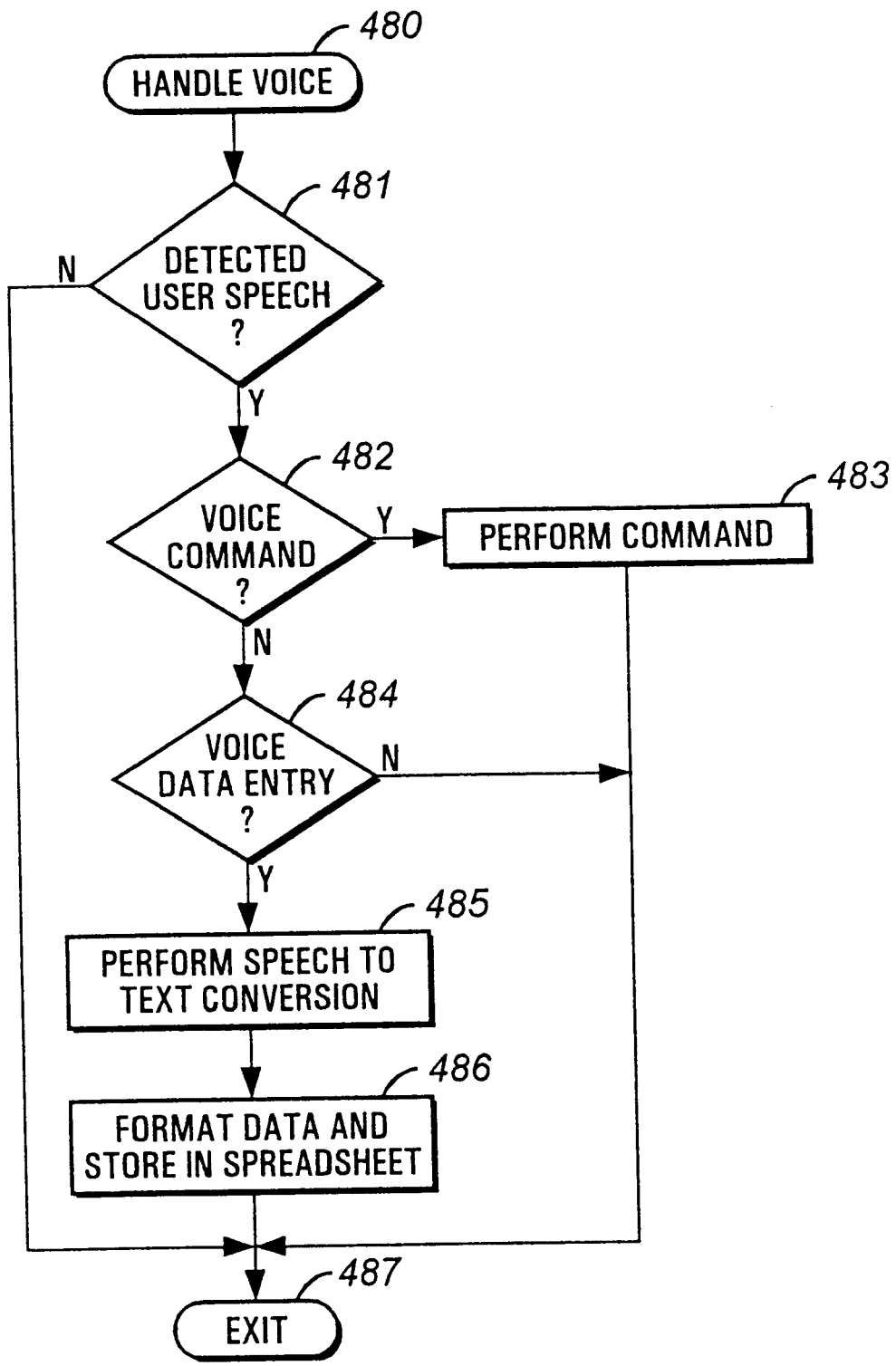
FIG. 21 is a flowchart illustrating the process for capturing and processing voice commands and annotations using the microphone and analog to digital converter of FIG. 1.

In addition to receiving commands by the pen or the keyboard, the data processor of the present invention also provides speech recognition capability as another mode of data entry. Turning now to FIG. 21, the routine to process voice commands and data is illustrated in more detail. In FIG. 21, the routine waits for a speech pattern directed at the computer system 10 of FIG. 1. If no speech patterns exist, the routine simply exits in step 480. Alternatively, if voice is directed at the system, the routine 480 checks if the voice data is a command or an annotation in step 482. If a command, the routine performs the voice command in step 483 before it exits in step 487. Alternatively, if the speech pattern does not relate to a voice command, the routine proceeds to step 484 to check on voice annotations. If the voice input is a voice data annotation, the routine proceeds from step 484 to step 485 where voice is converted into computer readable text. From step 484, the routine formats the converted data in step 486 such that the spreadsheet can process the dictated spreadsheet data entry. From steps 481, 483 or 486, the routine exits FIG. 18 in step 487.

Figure 22:
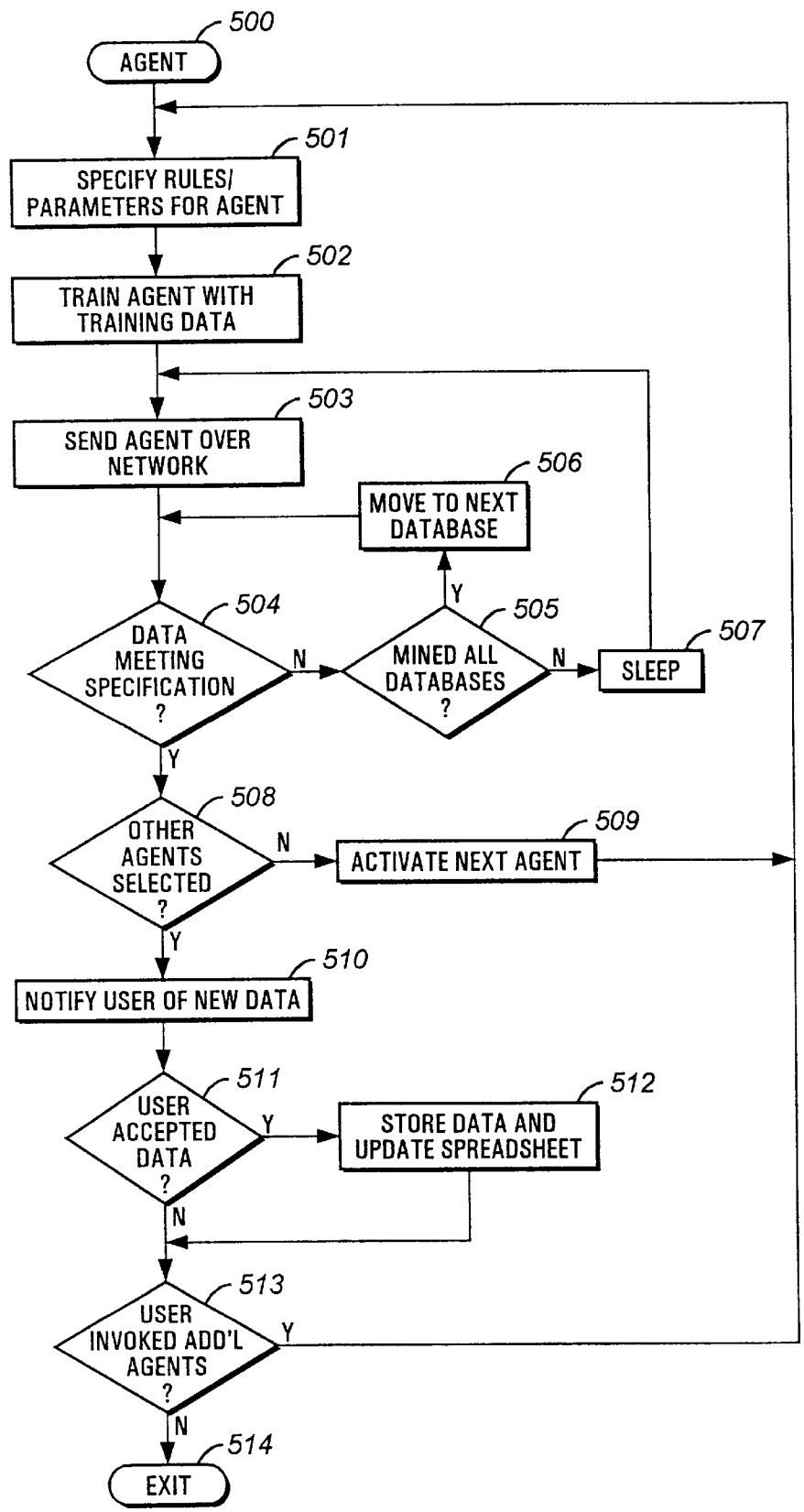
FIG. 22 is a flow chart of the process for operating an intelligent agent in conjunction with the computer system of FIG. 1.

As discussed above, data can be collected into the spreadsheet by scanning and performing OCR on images or by capturing voice and performing a speech to text recognition on the dictation. Additionally, intelligent agents can be used in conjunction with the computer system of FIG. 1 to locate/process information over a network via the two-way communication device 31. Smart agents can automatically route user-specified data from the Web, other on-line services, and E-mail messages and faxes, to the computer of FIG. 1. In FIG. 22, a software entity called an "agent" serves as an independent source of expertise designed to perform particular tasks or sets of tasks. These agents continually process and update requests, even though the user is no longer connected to the network. These agents can also "mine" sites for information and retrieve only data relevant to the user. Further, the agents can be activated on demand to serve a particular purpose and then be deactivated after accomplishing solely that purpose. The agents navigate through computer networks such as the Internet to search for information and perform tasks for their users. The collected data from the search or the results of the execution of the tasks are compressed and delivered to the portable computer system of FIG. 1 the next time a wireless connection is established with the two-way communication device 31.

Turning now to FIG. 22, a flow chart showing the process of specifying an intelligent agent capable of operating with the two-way communication device 31 is shown. In FIG. 22, the routine accepts rules and parameters for the intelligent agent in step 1501. The intelligent agent of FIG. 22 is rule driven. Rules can be specified with a simple English like syntax to set slot values, create objects, among others, and can be organized into rulebases when the rules deal with related conditions and actions. A set of rules activates when its rulebase is loaded and deactivates when the rulebase is flushed. This collection of rulebases is collectively called the "agent."

Agents can use rules to inference about the data, create new data or modify existing data. The two fundamental search strategies of these agents include forward and backward chaining. Forward chaining, which is a data driven process, proceeds from premises or data to conclusions. Alternatively, backward chaining, or goal-driven approach, proceeds from a tentative conclusion backward to the premises to determine whether the data supports that conclusion. Further, a combination of forward and backward chaining can be used to optimally solve a particular problem. Details of various expert systems suitable for use are discussed in James P. Ignizio's book *Introduction to Expert Systems—The Development and Implementation of Rule-Based Expert Systems*, hereby incorporated by reference. Additionally, the present invention contemplates that other artificial intelligence constructs, including neural networks, fuzzy logic system, and others known to those skilled in the art may be applied in place of the expert system. The present invention also contemplates that the intelligent agent can be specified using an object oriented language such as Java such that it is free to roam the Internet and other networks with Java compatible browsers.

After the rules, strategies and parameters have been specified for the agent in step 1501, the routine trains the agent in step 1502 with training data, if necessary in the event that neural networks and the like are to be used in implementing the agent. Next, the routine sends the agent over a network such as the Internet in step 1503. In step 1504, the agent checks if the data it encountered satisfy the rules and parameters that the agent is looking for. If not, the routine proceeds to search the next database. From step 1504, the routine checks if all databases have been mined in step 1505. If not, the routine moves to the next database in step 1506 before it loops back to step 1504. Alternatively, from step 1505, if all databases have been mined and the agent still has not located responsive information, it puts itself to sleep in step 1507. The agent periodically wakes up and broadcasts itself once more in step 1503 to continue searching for responsive materials.

From step 1504, in the event that responsive documents have been located, the agent checks in step 1505 whether it is instructed to call other agents in step 1508. If so authorized, the agent invokes other agents in step 1509. When the agent reports back with information, the host computer proceeds to notify the user with data located in step 510. In step 511, if the user accepts the data, the routine of FIG. 22 stores the data and updates the spreadsheet with information in step 512. Next, the routine checks if the user has invoked additional agents in response to the information detected by the original agent. If so, the routine proceeds from step 512 to step 513 where additional agents are launched or additional routines are executed. From step 513, if the user does not invoke additional agents, the routine of FIG. 22 simply exits. Thus, the agent of FIG. 22 can respond to the verbal, handwritten, hand-drawn, or typed command or data from the user and intelligently perform the requested action, be it a data search or various user specified actions. Thus, these agents are capable of gathering information resourcefully, negotiating deals, and performing transactions on their user's behalf. Furthermore, the agent can have contingency plans such as they are aware of their environment when situated in different places and act accordingly.

Furthermore, the present invention also provides a database management system which acts in conjunction with the spreadsheet of the present invention to optimally manage data on behalf of the user. The purpose of a database management system is to store, maintain, and retrieve database records in files. A file collects records of the same format that serve a common purpose. Traditionally, general purpose database management systems use four language interfaces between the application programming language and the database manager: a data definition language, a data manipulation language, a query language and a report writer language. The data definition language defines the format, or schema, of the database by identifying the files, record formats, and relationship between files. The data manipulation language is the applications program interface to the database management system such as the opening, closing of the database or the adding, changing or deleting of records of the database. The query language allows the database to be searched according to a search criteria, while the report writer language allows the user to generate a report based on the result of the query.

Figure 23:
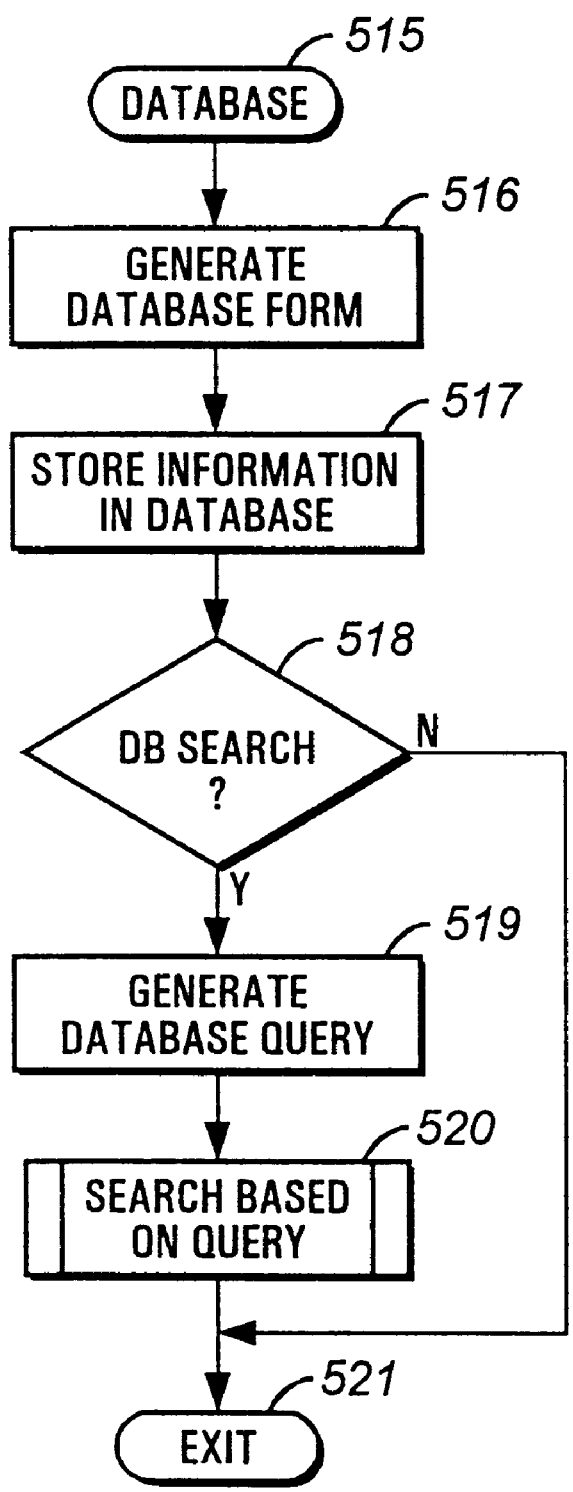
FIG. 23 is a flowchart illustrating the process for operating a database in accordance with the computer system of FIG. 1.

Turning now to FIG. 23, the process for creating and using the database in conjunction with the non-cursive handwriting recognizer and the speech recognizer is shown. From step 515, the routine of FIG. 23 generates one or more database forms in step 516. The database forms are the user interface for the records of data stored in the database. The process for creating the form of step 516 is shown in more detail in FIG. 24.

From step 516, the routine of FIG. 23 allows the user to enter information into the records of the database in accordance with the data entry format specified in the form creation step 516. The data may be entered by writing, scanning, dictating or by an agent sent over the Internet for hunting down relevant data.

From step 517, once data has been entered into the database of the present invention, the routine of FIG. 23 checks if the user wishes to perform a database search in step 518. If not, the routine exits. Alternatively, if a search is to be done, the routine prompts the user for a database query in step 519. From step 519, a search is carried out in step 520 before the database routine of FIG. 23 exits in step 521.

In the present invention, the data definition language stored in the form specification is preferably iconized such that the user can quickly layout a data entry form using a graphical specification. Preferably, the icons displayed include control objects such as text boxes, check boxes, dialogs, option buttons, labels, among others. The user can simply pick the control icon and place the control icon on its appropriate position on the LCD display. Next, the user select the appropriate attributes of the control icon such as caption, font, and dimensions, in a manner similar to the selection and customization of controls in Visual Basic or Visual C++, available from Microsoft Corporation of Redmond, Wash. The user repeats this process until all the data element have been defined, formatted, and positioned on the form. The present invention also contemplates that the database can simply a free-text database without any control icon restrictions, or in the event that control icons are appropriate and necessary, a smart agent can be used to help a new user to select the right controls and their attributes by asking the user questions about the type of data to be stored by the database, generating the icons, and allowing the user to move and/or adjust the attributes.

Figure 24:
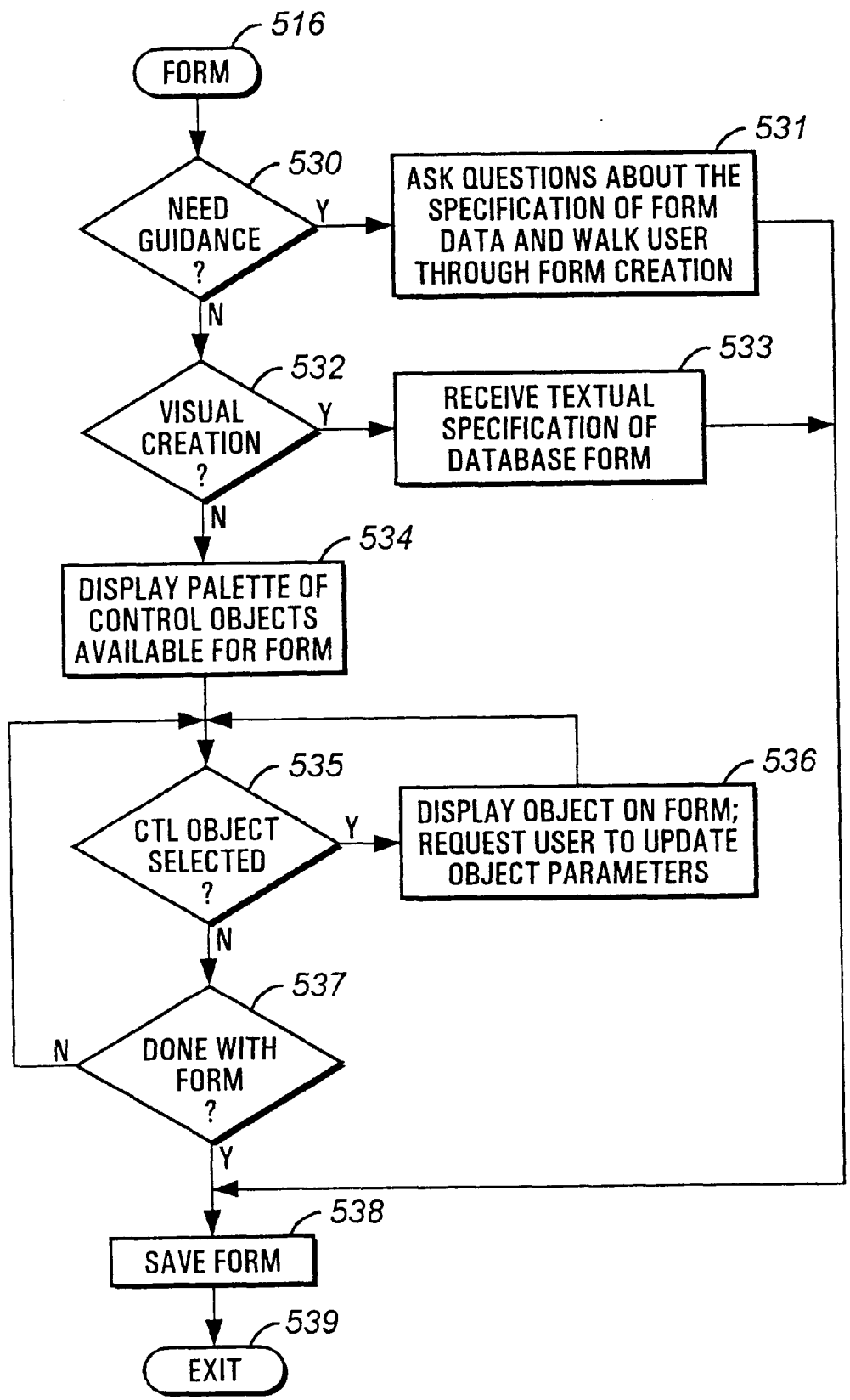
FIG. 24 is a flowchart illustrating the process for generating a form for the database of FIG. 23.

Turning now to the process for creating forms on the database, shown in FIG. 24, from step 516, the routine checks if the user needs the assistance of an intelligent agent in formulating the form of the database in step 530. If the user requires assistance, the intelligent guides the user through the form set up process in step 531 by asking the user information about the relevant fields, their formats, among others. Once the fields and their characteristics have been identified, the intelligent agent generates a generic form with the fields required for the user's application and saves the new form in step 538 before it exits.

Alternatively, if the user does not require the assistance of the agent in step 530, the routine of FIG. 24 checks if the user wishes to create the form using a visual format in step 532. If not, the routine of FIG. 24 proceeds to step 533 where it accepts textual specifications of the database form from the user. Next, the form information is saved in step 538 prior to exiting the routine. In the event that the user wishes to create the form layout graphically in step 532, the routine of FIG. 24 displays a palette of control objects available for the form in step 534. These control objects include a check box, a pop-up menu, a pop list, a text field, a numeric field, a table field, a date/time field, currency filed, ink field, a formulas field, a look-up field, a barcode field, and a GPS field. Next, the routine waits until the user select an object in step 535. Once the control object has been selected, the routine transitions to step 536 where it displays the object on the form and requests the user to enter the object parameters, including the object dimensions and formatting characteristics, among others. From step 536, the routine loops back to step 535 to wait for the next object selection. From step 535, the routine checks if the user is done with the form creation process in step 537. If not, the routine simply loops back to step 535 to await the next user selection. Alternatively, if the user has completed the graphical form creation process in step 537, the form created is saved in step 538 before the routine of FIG. 24 exits in step 539.

Once the database forms have been generated, data can be entered into the database by writing data to the fields of each record in the database. Alternatively, the data can be imported from raw text, from other dBase files, or from the spreadsheet data files of the present invention. Additionally the data can be scanned in using the scanner/bar code reader discussed above, dictated in using the speech recognition engine, or delivered from an external source such as the Internet 150 using smart agents as discussed above or live-data databases that respond to data changes and events such as those discussed in K. C. Hopson and Stephen E. Ingram's book *Developing Professional Java Applets* (1996) or the live-data product available from Cycle Software, Inc. located in Quincy, Mass. Furthermore, the database of the present invention automatically classifies and handles information presented to the database. For instance, if the field definition generated in step 534 of FIG. 24 specifies two barcode fields, the first barcode data captured will be assigned to the first barcode field, while the subsequent barcode data will be assigned to the second barcode field, even if the barcode fields are not adjacent to each other. The same processing is provided to handle GPS data.

Figure 25:
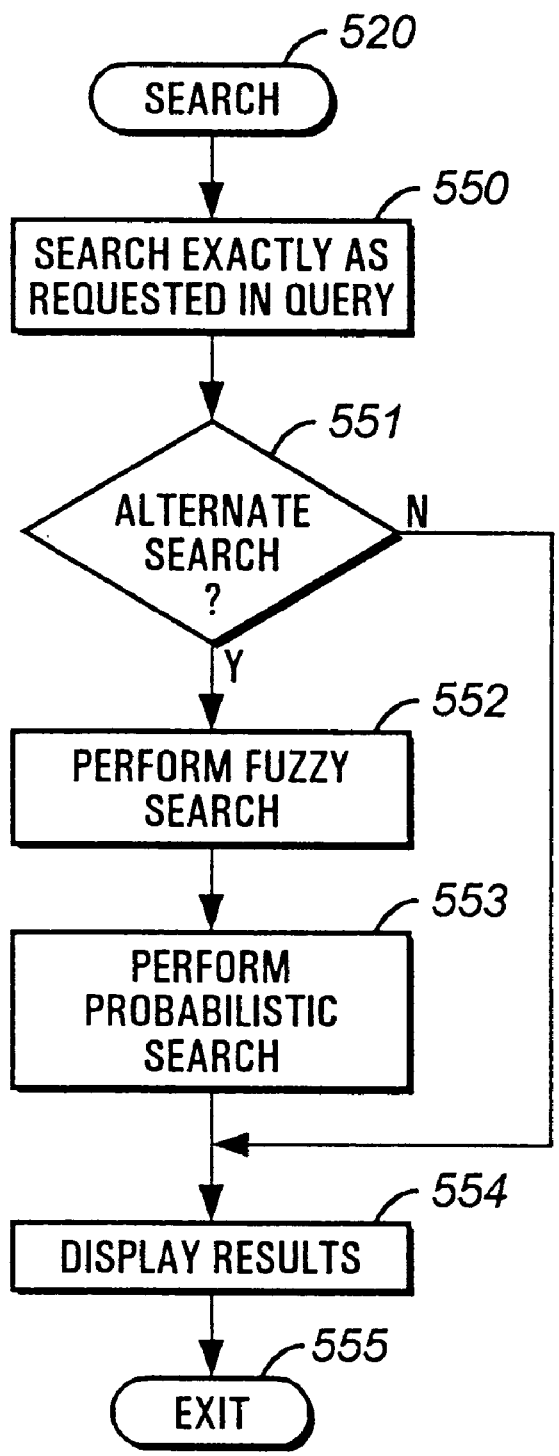
FIG. 25 is a flowchart illustrating the process for searching the database of FIG. 23.

After the creation of the database forms and the entry of data by the user or the agent, the user can generate reports and/or update the database via the query language, the manipulation language and the report writer. The query language interface can simply be a standard dBase-like query commands, as known to those skilled in the art. Alternatively, the query language interface can be an easy to query language where the user simply enters the field to search and the appropriate search parameters. The search is then conducted in accordance with the parameters. Turning now to FIG. 25, the routine to handle the search process 520 of FIG. 23 is shown. In FIG. 25, the routine first searches the database as exactly requested in step 550. The search process can be an indexed search or a binary search for speed reasons, as known in the art. From step 550, the routine checks if the user has designated that non-traditional searches are to be done in step 551. If so, the routine proceeds to step 532 where it performs an inexact fuzzy search by looking for records with fields that almost, but not exactly, matched the query request, in a manner analogous to the fuzzy search done in speech recognition, as discussed in the incorporated by reference patent application Ser. No. 08/461,646. Furthermore, a probabilistic search is performed in step 553. The probabilistic search looks up equivalent words using a thesaurus and the replaces the keyword with equivalent words according a probability distribution, in accordance with the context of word usage. The present invention also contemplates that Soundex expansion techniques, as known in the art, may be used to expand the keyword search.

When records matching the search criteria are located, they are displayed on the screen on a record by record basis, ready for inspection by the user in step 554 before the routine exits in step 555. However, such manual inspection is appropriate only if the user wishes to edit the records. When the user wishes to summarize or tabulate the results rather than to examine the responsive records, he or she can use the report writer to generate reports. In the preferred embodiment, the report writer accepts d-Base compatible report generator requests. Alternative, for users who are not familiar with d-Base, the report generator displays a report form with an option list consisting of available field captions, as generated during the data definition language phase. In addition, the option list includes operator buttons such as column and row summations, among others. Using the option list, the user can select and place the fields to be displayed.

Figure 26:
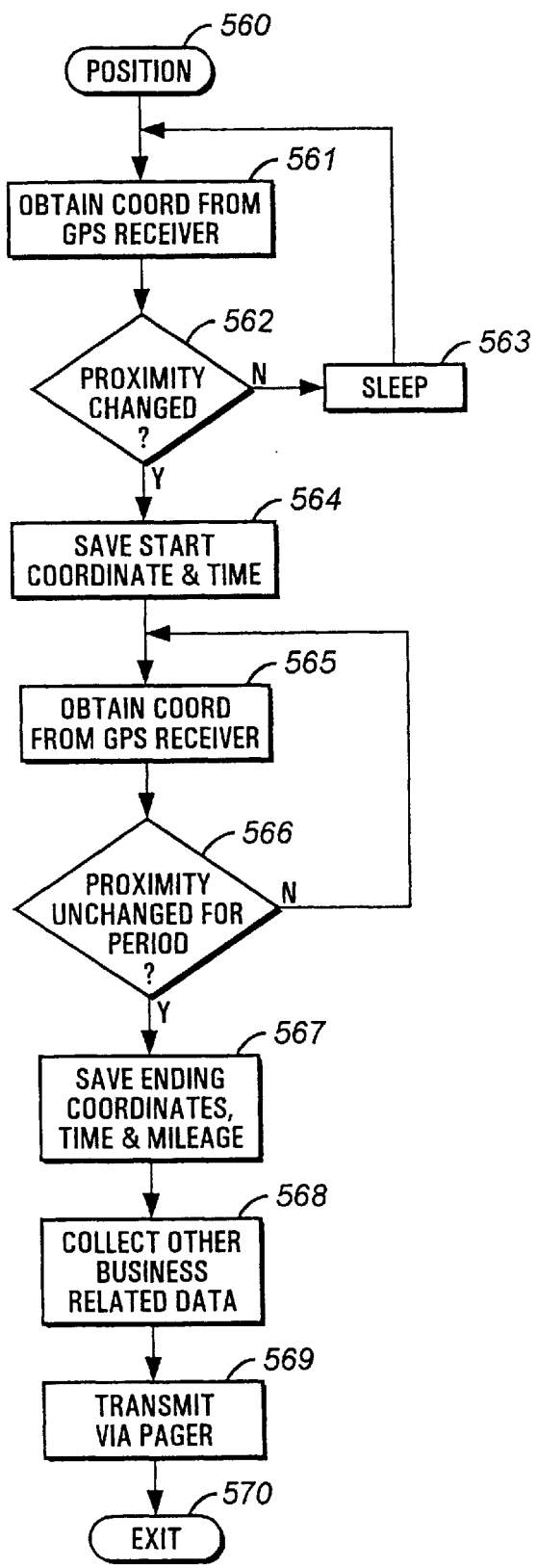
FIG. 26 is a flowchart illustrating the process for using the GPS receiver of FIG. 1.

Turning now to FIG. 26, the process for handling GPS data is shown. In FIG. 26, from step 560, the current coordinate data is queried from the GPS receiver 46 in step 561. From step 561, the routine of FIG. 26 proceeds to step 562 where the routine detects whether the portable computer is within a predetermined proximity. In step 562, if the portable computer has not moved, the routine proceeds to step 563 where the routine puts itself to sleep. From step 563, after a predetermined period, the routine of FIG. 26 wakes up and proceeds to step 561 to check whether the portable computer has moved. From step 562, in the event that the portable computer has moved, the routine proceeds to step 564 where the beginning coordinate and time information are saved. Next, the routine samples the output of the GPS receiver 46 in step 565. In step 566, the routine checks if the position of the GPS receiver 46 has changed. If not, the routine loops back to step 565 to continue acquiring GPS data. Alternatively, if data from the GPS receiver 46 indicate that the GPS receiver 46 has altered or moved, its position, the routine of FIG. 26 proceeds from step 566 to step 567 where it waits until the GPS receiver 46 has stopped moving, typically by checking if the proximity remains unchanged for a predetermined period of time. When the GPS receiver 46 stops moving, the routine proceeds to step 567 where it saves the ending coordinate and ending time. Furthermore, the routine computes the mileage incurred for the trip in step 567.

From step 567, the routine collects other business data in step 568. The type of data collect varies with the application. For instance, for lawyers, the data collected may simply be time and expense and case management applications. For medical practitioners, the data collected may consist of patient information, drug interaction, type of treatment provided, and billing related information, among others. For salesperson, the data collected may relate to order taking, inventory checking, creating to-do list, and pricing, among others. From step 568, the routine collates the data into one or more packets, compresses the packets and transmits the data via a suitable wireless transmitter such as the pager or the wireless transceiver 31 before the routine of FIG. 26 exits in step 570.

Figure 27:
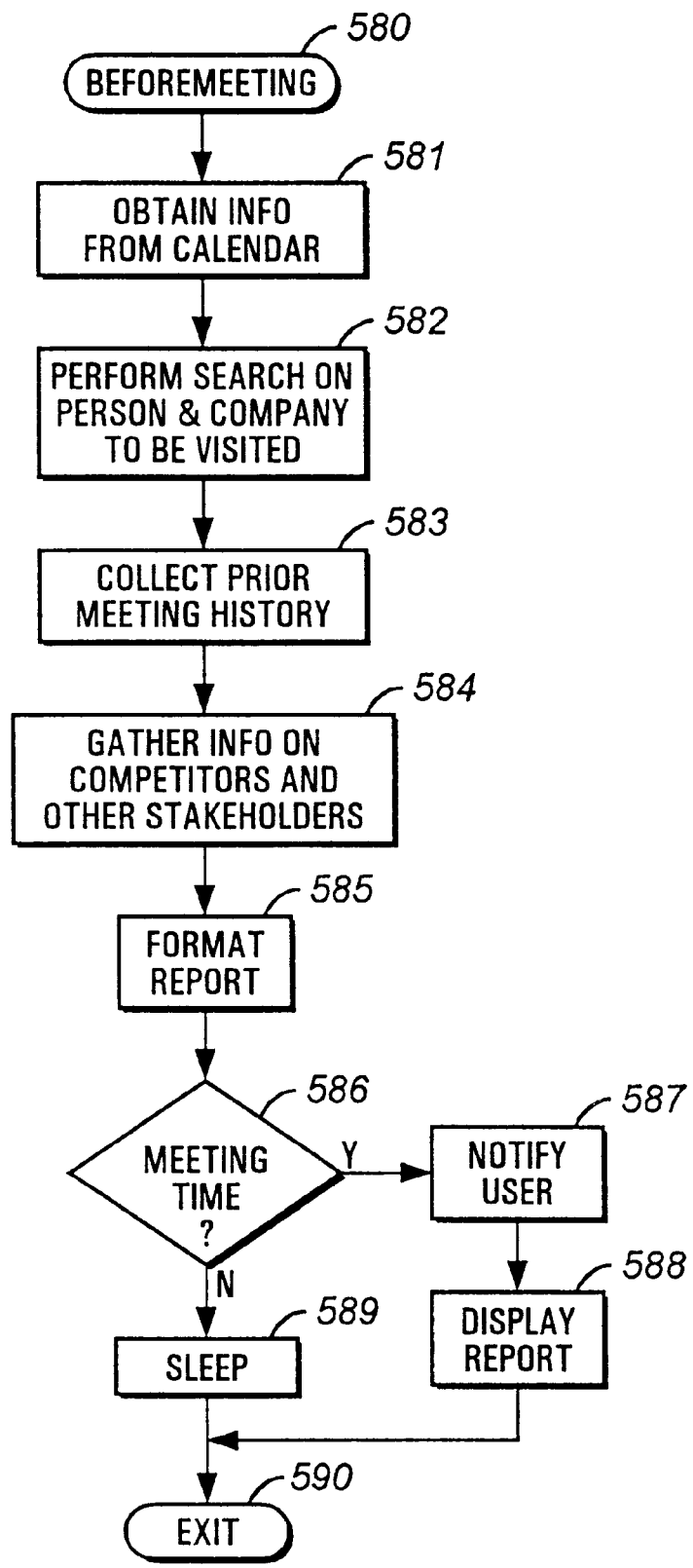
FIG. 27 is a flowchart illustrating an agent on the computer of the present invention which prepares information needed for a meeting.
Figure 28:
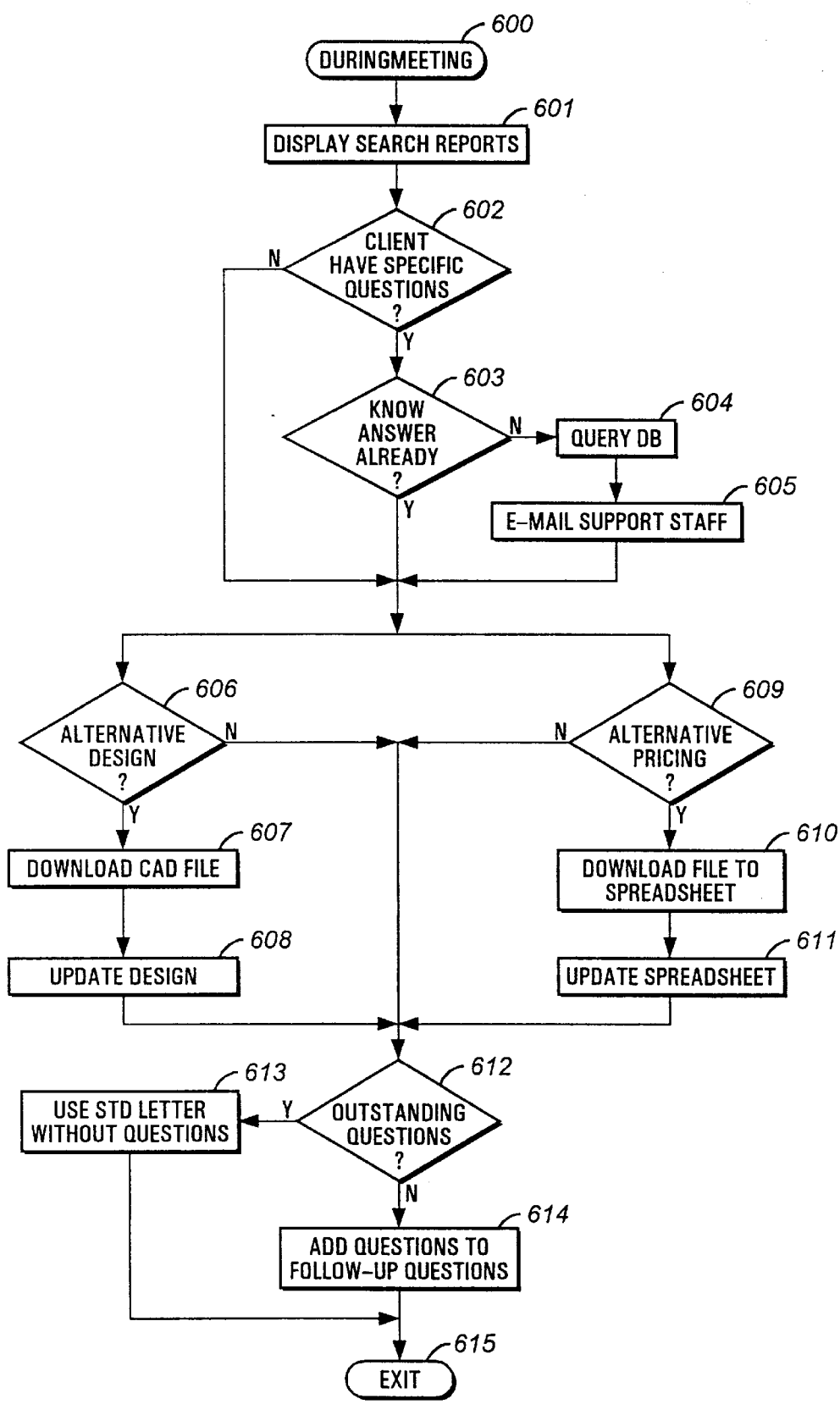
FIG. 28 is a flowchart illustrating the process for collecting data and interacting with various information networks using the computer of the present invention during the meeting.
Figure 29:
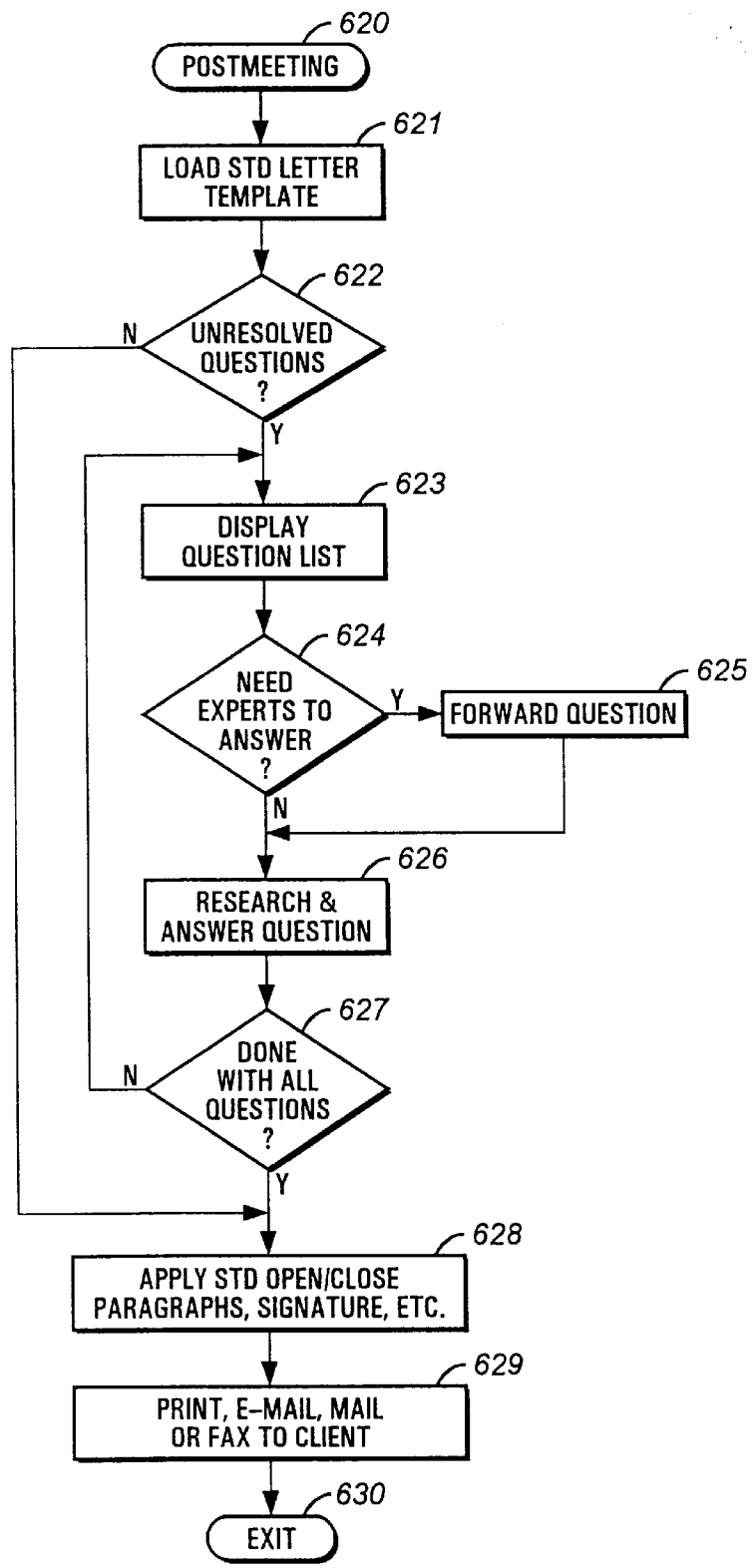
FIG. 29 is a flowchart illustrating the process for following up on outstanding action items using the data management computer of the present invention.

Referring to FIGS. 27 through 29, routines for supporting a meeting are shown. The routines in FIGS. 27 through 29 provide automated support for mobile users and in effect act as an intelligent researcher or agent for the users. The agent is necessary to protect the user from an increasing information overload in modern life while allowing the user to maintain control over.

FIG. 27 illustrates the detail of the data search and preparation before a meeting takes place. From step 580, the routine of FIG. 27 proceeds to step 581 where the routine checks with the calendar engine for meetings scheduled for a particular date. From step 581, for each meeting calendared, the routine performs a search on the company and individuals scheduled for the meeting in step 582. Next, the routine checks in its internal records for historical data of prior meetings in step 583. In this step, the routine also attempts to identify areas of agreement and disagreement, as well as the personal information of the people in the meeting to remind and prepare the user of hot-spots to be careful on in the meeting.

From step 583, the routine of FIG. 27 proceeds to step 584 where it searches for information relating to the competition as well as other potential stakeholders. The search starts with in-house data and sweeps outwardly toward the Internet 150. This step preferably deploys the intelligent agent of FIG. 22. As a first step, the agent of FIG. 22 enters the respective competitor's name into search engines such as Yahoo, AltaVista, HotBot or Infoseek. The agent may also check the competitor's financial health by performing a search in Hoover's Online, located at http://www.hoovers.com, and a search at the U.S. Securities & Exchange Commission, located at http://www.sec.gov. Other sites with financial information on public and private companies that can be searched by the agent of FIG. 22 include http://www.pathfmder.com, http://www.avetech.com, http://www.dbisna.com.

For general news regarding a particular company, the agent of FIG. 22 can search Ecola's 24-hour newsstand, located at http://www.ecola.com, which links to more than 2,000 newspapers, journals, magazines and publications. Additionally, the agent can search CNN Interactive at http://www.cnn.com for archived information going back a few weeks. Furthermore, the agent of FIG. 22 can search the Knowledge Index on CompuServer, and the Electric Library, available at http://www.elibrary.com, for scouring magazines, reference works and news wires. Furthermore, MediaFinder, located at http://www.mediafinder.com, provides an index and description of thousands of newsletters, catalogs and magazines.

The agent of FIG. 22 also provides the ability to listen in on conversations regarding a particular company by news groups and discussion groups prevalent in the Usenet section of the Internet 50. For a searchable directory of E-mail discussion groups, the agent of FIG. 22 reviews Deja News Research Service, located at http://www.dejanews.com, and Liszt, located at http://www.liszt.com.

As a last resort when the above searches turn up empty, the agent of step 584 checks sites that have compiled good collections of business resources, including John Makulowich's Awesome Lists, located at http://www.clark.net, American Demographics, located at http://www.demographics.com, ProfNet, located at http://www.vyne.com, StartingPoint, located at http:H/www.stpt.com, Babson College, located at http://babson.edu, and Competitive Intelligence Guide, located at http://www.fuld.com. Additionally, the present invention contemplates that yet other sites can be searched as well for competitive information, including the Lexis/Nexis database, the Westlaw database, various judicial decisions at Villanova University, licensing information from Licensing Executive Society at http://www.les.org, and the patent abstract information database from the U.S. Patent & Trademark Office, or alternatively, abstracts from MicroPatent, located at http://www.micropat.com, among other sites.

From step 584, the routine formats the collected information of steps 583–584 in step 585. Next, the routine proceeds to step 586 where it checks to see if it is time to meet. If so, the routine proceeds to step 587 where it notifies the user of the meeting and displays the formatted report of step 585 in step 588. Alternatively, if it is not yet meeting time in step 586, the routine proceeds to step 589 where it puts itself to sleep until the next check interval. From step 588 or 589, the routine of FIG. 27 exits in step 590.

Turning now to FIG. 28, the processes occurring during the meeting scheduled in FIG. 27 are shown in more detail. From step 600, the routine proceeds to step 601 where it displays the reports generated in step 585 of FIG. 27. Further, the routine checks in step 602 whether the customer or client has specific questions. If so, the routine proceeds to step 603 where, in the event that the user does not know the answer already, the routine jumps to step 604 where it queries a database and allows the user to electronically mail questions to the technical staff in step 605.

From steps 602, 603 or 605, the routine proceeds in two parallel paths. In the event where a customized design is necessary for the customer in step 606, the routine proceeds from step 606 to step 607. In step 607, the routine downloads the requisite computer aided design (CAD) file for editing purposes. From step 607, the routine proceeds to step 608 where the design can be updated using a number of tools, including the tools disclosed in the incorporated by reference patent applications.

From steps 602, 603 or 605, the routine of FIG. 28 also checks if the customer desires an alternative pricing in step 609. If so, the routine downloads pricing information from the host to the portable computer in step 610 and applies the spreadsheet discussed above to the data in step 611.

From steps 606, 609, 608 or 611, the routine proceeds to step 612 where it checks if outstanding questions remains. If not, the routine proceeds from step 612 to step 613 where it flags that a standard follow-up letter without questions is to be used. Alternatively, in the event that outstanding questions remain to be answered, the routine proceeds from step 612 to step 614 where it adds to the list of follow-up questions. From step 613 or 614, the routine of FIG. 28 exits.

Referring now to FIG. 29, the routine to process events after the meeting is shown. From step 620 of FIG. 29, the routine proceeds to step 621 where it loads a standard letter template which provides the foundational structure for the correspondence. From step 621, the routine checks if unresolved questions remain in step 621. If so, the routine proceeds to step 623 where it displays the question list in step 623 to remind the user of the items to be addressed in the correspondence. Next, in step 624, in the event that the answer requires an expert, the routine proceeds from step 624 to step 625 where the routine forwards the question to the appropriate person.

From step 624 or step 625, the routine proceeds to step 626 where the question is answered. Next, in step 627, the routine checks if it is done with all questions. If not, the routine loops back to step 623 to answer the next question in the list. Alternatively, if all questions have been answered in step 627 or step 622, the routine proceeds to step 628 where it applies standard closing paragraphs as well as a signature facsimile. Furthermore, to the extent some personalized compliments or congratulations can be made, as identified in step 582 of FIG. 27, the routine also applies these congratulatory remarks to the correspondence. Next, in step 629, the routine prints, e-mail, postal mail, or fax the correspondence to the client or customer before exiting in step 631 of FIG. 29.

The present invention thus provides a convenient system for accepting and manipulating data using a spreadsheet or a database such that the user can quickly write commands or data on a mobile computer with a relatively compact screen. Further, the present invention integrates speech and typed data entry to provide a user friendly computer system. Further, the spreadsheet or database system of the present invention can be used in two-way messaging systems to support object linking and embedding like capabilities. Data can be imported into the spreadsheet or database by scanning or dictating the information to the computer system. The present invention also supports an intelligent agent operating with the computer to locate responsive information, as specified by the spreadsheet or database system of the present invention.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A hand held computer system for managing multimedia data for convenient input and output to a user, comprising:

a microprocessor;

a program storage device coupled to said microprocessor;

a communications port coupled to said microprocessor, said communications port adapted to link said microprocessor to input/output devices;

a program stored in said program storage device whose instructions implement a data decompression engine coupled to a multimedia application for receiving a compressed message and decoding said multimedia application message from said compressed message;

a message manager coupled to said data compression engine adapted to transmit a compressed message over a medium to said communications port;

an input recognizer embodied in said program storage device, said input recognizer adapted to receive non-cursive handwritings from said user, said handwritings being a set of modified characters, and convert said non-cursive handwritings into text data;

a computer readable code embodied in said program storage device and coupled to said input recognizer for receiving said non-cursive handwritings, said computer readable code storing said multimedia data and allowing said user to process said multimedia data.

2. The portable computer system of claim 1, further comprising a video camera removably coupled to said processor.

3. The portable computer system of claim 2, further comprising a videoconferencing system coupled to said video camera.

4. The portable computer system of claim 1, further comprising a scanner removably coupled to said processor.

5. The portable computer system of claim 4, further comprising an optical character recognition (OCR) engine coupled to said processor and said scanner.

6. The portable computer system of claim 1, further comprising:

a voice recorder removably coupled to said processor;

a microphone coupled to said voice recorder; and a speaker coupled to said voice recorder.

7. The portable computer system of claim 1, further comprising:

an analog to digital converter coupled to said processor;

a microphone coupled to said voice recorder; and a speech recognizer coupled to said processor and to said analog to digital converter.

8. The portable computer system of claim 1, further comprising a communications unit coupled to said processor.

9. The portable computer system of claim 6, further comprising a peripheral device selected from the group consisting of a camera, a scanner, a tuner, an audio system, a modem, a voice recorder, and a display, said peripheral device coupled to said communications unit to provide data to said processor in a non-contact manner.

10. The portable computer system of claim 6, further comprising a remote display coupled to said processor and said communications unit.

11. The portable computer system of claim 1, further comprising an audio system removably coupled to said processor.

12. The portable computer system of claim 1, further comprising a tuner adapted for receiving television or radio transmission, said tuner being removably coupled to said processor.

13. The portable computer system of claim 1, wherein said computer readable code is a database.

14. The portable computer system of claim 13, wherein said database performs searches using a probabilistic search.

15. The portable computer of claim 1, further comprising:
- an application executing on said computer, said application generating one or more messages having one or more instructions;
- a data compression engine coupled to said application, said data compression engine generating a compressed message from said application message; and
- a message manager coupled to said data compression engine, said message manager adapted to transmit said compressed message over a media.

16. The portable computer of claim 15, further comprising:
- a resource;
- a decompression engine adapted to receive said compressed message and decoding said application message from said compressed message;
- an event manager coupled to said decompression engine, said event manager queuing said application message; and
- an event handler coupled to said event manager and to said resource, said handler accessing said resource in accordance with said message instructions.

17. The portable computer system of claim 1, further comprising a Java compiler or interpreter coupled to said processor.

18. The portable computer system of claim 1, further comprising an intelligent agent adapted to be sent by said processor to a remote network for data collection purposes.

19. The portable computer system of claim 18, wherein said intelligent agent is sent over an Internet for data collection purposes.

20. The portable computer of claim 18, wherein said intelligent agent comprises:
- a first code for specifying a goal for said intelligent agent;
- a second code coupled to said first code for sending said agent over a network;
- a third code coupled to said second code, said third code mining databases existing on said network in search of data satisfying said goal; and
- a fourth code coupled to said third code for reporting results back to the portable computer.

* * * * *